(12) United States Patent
Gilon et al.

(10) Patent No.: US 8,033,110 B2
(45) Date of Patent: Oct. 11, 2011

(54) SOLAR POWER GENERATION WITH MULTIPLE ENERGY CONVERSION MODES

(75) Inventors: Yoel Gilon, Jerusalem (IL); Arnold J. Goldman, Jerusalem (IL); Israel Kroizer, Jerusalem (IL); Gideon Goldwine, Jerusalem (IL); Gil Kroyzer, Jerusalem (IL)

(73) Assignee: Brightsource Industries (Israel) Ltd., Jerusalem (IL)

( * ) Notice: Subject to any disclaimer, the term of this patent is extended or adjusted under 35 U.S.C. 154(b) by 252 days.

(21) Appl. No.: 12/404,663

(22) Filed: Mar. 16, 2009

(65) Prior Publication Data

US 2009/0229264 A1    Sep. 17, 2009

Related U.S. Application Data

(60) Provisional application No. 61/036,959, filed on Mar. 16, 2008, provisional application No. 61/053,341, filed on May 15, 2008, provisional application No. 61/140,966, filed on Dec. 28, 2008.

(51) Int. Cl.
*B60K 16/00* (2006.01)

(52) U.S. Cl. ................... 60/641.11; 60/641.15

(58) Field of Classification Search ..... 60/641.8–641.15
See application file for complete search history.

(56) References Cited

U.S. PATENT DOCUMENTS

| | | | |
|---|---|---|---|
| 3,892,433 A | 7/1975 | Blake | |
| 3,924,604 A | 12/1975 | Anderson | |
| 4,034,735 A | 7/1977 | Waldrip | |
| 4,044,753 A | 8/1977 | Fletcher et al. | |
| 4,117,682 A | 10/1978 | Smith | |
| 4,172,443 A | 10/1979 | Sommer | |
| 4,219,729 A | 8/1980 | Smith | |
| 4,227,513 A | 10/1980 | Blake et al. | |
| 4,245,618 A | 1/1981 | Wiener | |
| 4,265,223 A | 5/1981 | Miserlis et al. | |
| 4,289,114 A | 9/1981 | Zadiraka | |

(Continued)

FOREIGN PATENT DOCUMENTS

DE          10248068          5/2004

(Continued)

OTHER PUBLICATIONS

BCB Informatica y Control. Heliostat Calibration for Concentrating Solar Power Plants Using Machine Vision [online]. [retrieved on Nov. 17, 2009]. Retrieved from the Internet: <URL: http://bcb.es/documentos/descargar.php?id=29>.

(Continued)

*Primary Examiner* — Hoang Nguyen
(74) *Attorney, Agent, or Firm* — Miles & Stockbridge P.C.; Mark A. Catan

(57) ABSTRACT

A multi-mode solar power generation system can include a first energy conversion system that generates electricity from a working fluid heated by a portion of solar radiation focused by a plurality of heliostats. The multi-mode solar power generation system can also include a second energy conversion system that generates electricity from an unused portion of the focused solar radiation using a different energy conversion mode than that of the first energy conversion system. The second energy conversion system can include one or more photovoltaic converters, which directly convert solar radiation to electricity. The unused radiation from the first energy conversion system can include radiation spillage or dumped radiation from a thermal receiver of the first energy conversion system.

38 Claims, 13 Drawing Sheets

U.S. PATENT DOCUMENTS

| | | | |
|---|---|---|---|
| 4,331,829 A | 5/1982 | Palazzetti et al. | |
| 4,343,182 A | 8/1982 | Pompei | |
| 4,365,618 A | 12/1982 | Jones | |
| 4,459,972 A | 7/1984 | Moore | |
| 4,485,803 A | 12/1984 | Wiener | |
| 4,490,981 A * | 1/1985 | Meckler | 60/641.15 |
| 4,512,336 A | 4/1985 | Wiener | |
| 4,564,275 A | 1/1986 | Stone | |
| 4,633,854 A | 1/1987 | Mayrhofer | |
| 4,913,129 A | 4/1990 | Kelly et al. | |
| 5,128,799 A | 7/1992 | Byker | |
| 5,578,140 A | 11/1996 | Yogev et al. | |
| 5,759,251 A | 6/1998 | Nakamura et al. | |
| 5,861,947 A | 1/1999 | Neumann | |
| 5,862,799 A | 1/1999 | Yogev et al. | |
| 5,899,199 A | 5/1999 | Mills | |
| 5,905,590 A | 5/1999 | Van Der Sluis et al. | |
| 5,982,481 A | 11/1999 | Stone et al. | |
| 6,080,927 A | 6/2000 | Johnson | |
| 6,131,565 A | 10/2000 | Mills | |
| 6,310,725 B1 | 10/2001 | Duine et al. | |
| 6,597,709 B1 | 7/2003 | Diver, Jr. | |
| 6,653,551 B2 * | 11/2003 | Chen | 136/246 |
| 6,818,818 B2 * | 11/2004 | Bareis | 136/246 |
| 6,899,097 B1 | 5/2005 | Mecham | |
| 6,926,440 B2 | 8/2005 | Litwin | |
| 6,957,536 B2 | 10/2005 | Litwin et al. | |
| 6,959,993 B2 | 11/2005 | Gross et al. | |
| 811,274 A1 | 1/2006 | Carter | |
| 7,042,615 B2 | 5/2006 | Richardson | |
| 7,191,597 B2 | 3/2007 | Goldman | |
| 7,191,736 B2 | 3/2007 | Goldman | |
| 7,207,327 B2 | 4/2007 | Litwin et al. | |
| 7,296,410 B2 | 11/2007 | Litwin | |
| 7,331,178 B2 | 2/2008 | Goldman | |
| 2004/0231716 A1 | 11/2004 | Litwin | |
| 2005/0126170 A1 | 6/2005 | Litwin | |
| 2007/0084208 A1 | 4/2007 | Goldman | |
| 2007/0157614 A1 | 7/2007 | Goldman | |
| 2007/0157922 A1 | 7/2007 | Radhakrishnan et al. | |
| 2007/0221208 A1 | 9/2007 | Goldman | |
| 2008/0000436 A1 | 1/2008 | Goldman | |
| 2008/0011288 A1 | 1/2008 | Olsson | |
| 2008/0011290 A1 | 1/2008 | Goldman et al. | |
| 2008/0293132 A1 | 11/2008 | Goldman et al. | |
| 2008/0314438 A1 | 12/2008 | Tran et al. | |
| 2009/0107485 A1 | 4/2009 | Reznik et al. | |
| 2009/0217921 A1 | 9/2009 | Gilon et al. | |
| 2009/0250052 A1 | 10/2009 | Gilon et al. | |
| 2010/0006087 A1 | 1/2010 | Gilon et al. | |

FOREIGN PATENT DOCUMENTS

| | | |
|---|---|---|
| EP | 0106688 | 3/1985 |
| WO | WO 2004/067933 | 8/2004 |
| WO | WO 2007/118223 | 10/2007 |
| WO | WO 2008/114248 | 9/2008 |
| WO | WO 2008/118980 | 10/2008 |
| WO | WO 2008/128237 | 10/2008 |
| WO | WO 2008/154599 | 12/2008 |
| WO | WO 2009/015219 | 1/2009 |
| WO | WO 2009/015388 | 1/2009 |
| WO | WO 2009/055624 | 4/2009 |
| WO | WO 2009/103077 | 8/2009 |

OTHER PUBLICATIONS

"Central Receiver Systems" in: Stine, W.B., and Geyer, M., Power from the Sun [online], 2001 [retrieved on Nov. 17, 2009]. Retrieved from the Internet: <URL: http://www.powerfromthesun.net/Chapter10/Chapter10new.htm>, Chapter 10.

Rabl, A., "Tower Reflector for Solar Power Plan," *Solar Energy*, 1976, 18: pp. 269-271.

Stone, K.W., and Jones, S.A., "Analysis of Solar Two Heliostat Tracking Error Sources," Sandia National Laboratories, Report No. SAND99-0239C, Jan. 28, 1999.

Vant-Hull, L.L., and Pitman, C.L., "Static and Dynamic Response of a Heliostat Field to Flux Density Limitations on a Central Receiver," *Solar Engineering*, 1990, pp. 31-38.

* cited by examiner

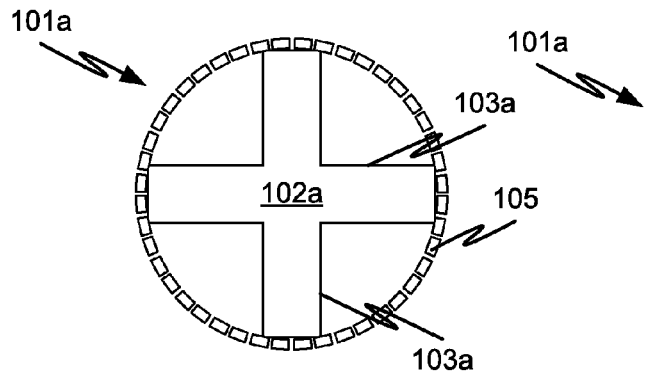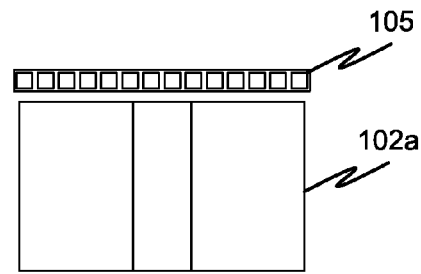
FIG. 3A　　　　　　　FIG. 3B
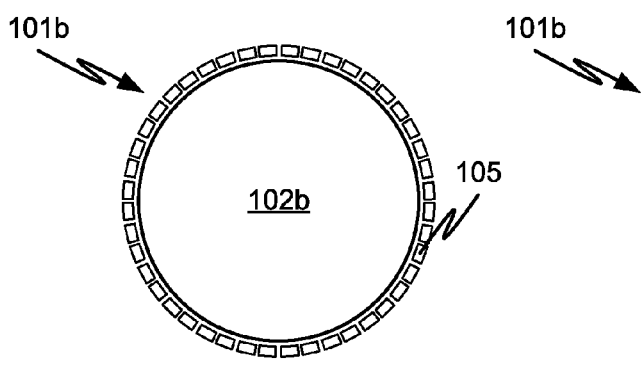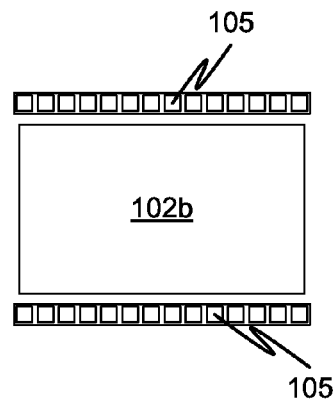
FIG. 3C　　　　　　　FIG. 3D
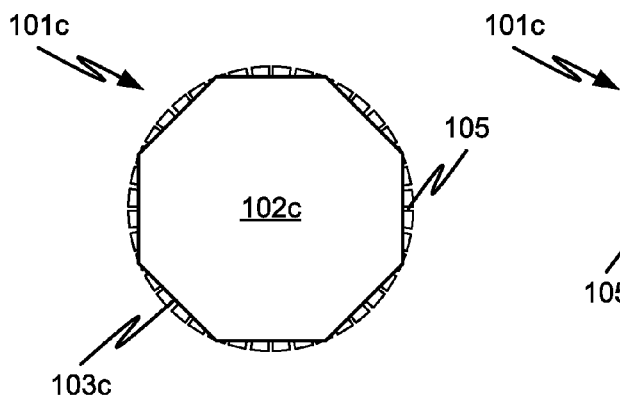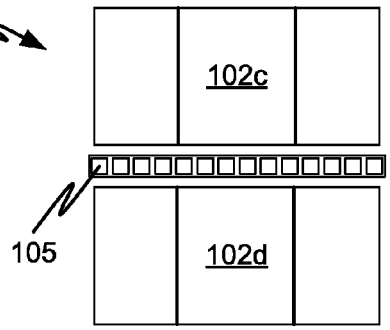
FIG. 3E　　　　　　　FIG. 3F

US 8,033,110 B2

SOLAR POWER GENERATION WITH MULTIPLE ENERGY CONVERSION MODES

CROSS-REFERENCE TO RELATED APPLICATIONS

The present application claims the benefit of U.S. Provisional Application No. 61/036,959, filed Mar. 16, 2008, U.S. Provisional Application No. 61/053,341, filed May 15, 2008, and 61/140,966, filed Dec. 28, 2008, all of which are hereby incorporated by reference herein in their entireties.

FIELD

The present disclosure relates generally to the conversion of solar radiation to electric power, and, more particularly, to the conversion of concentrated solar radiation to electric power using multiple energy conversion modes.

SUMMARY

A solar power generation system can have a thermal-electric power generation component, in which incident solar radiation is concentrated on a thermal receiver to heat a heat transfer or working fluid for use in electricity generation. A field of heliostat-mounted mirrors can reflect and concentrate incident solar radiation onto the thermal receiver. A portion of the reflected solar radiation may be unused or dumped from the thermal receiver due to one or more operating conditions. Reflected solar radiation that would otherwise be dumped can be captured by an alternate receiver or receiver portion using one or more supplemental energy conversion components. For example, concentrated sunlight dumped or spilled onto a photovoltaic converter can be directly converted to electricity. Such a photovoltaic converter may be located near or adjacent the thermal receiver of the thermal electric power generation component to minimize any displacement of heliostats that may be necessary for dumping purposes. The output derived from the supplemental conversion components may be captured and combined with existing systems employed in the thermal-electric generation of power.

Objects and advantages of the present disclosure will become apparent from the following detailed description when considered in conjunction with the accompanying drawings.

BRIEF DESCRIPTION OF THE DRAWINGS

Where appropriate, like reference numbers have been used to indicate like elements in the figures. Unless otherwise noted, the figures have not been drawn to scale.

FIGS. 3A and 3B are plan and elevation views, respectively, of a star-shaped receiver with an array of photovoltaic elements.

FIGS. 3C and 3D are plan and elevation views, respectively, of a cylindrical receiver with two arrays of photovoltaic elements.

FIGS. 3E and 3F are plan and elevation views, respectively, of a pair of polygonal receiver portions with an array of photovoltaic elements.

DETAILED DESCRIPTION

A central receiver system, such as one with a receiver supported on a tower, can include at least one solar receiver and a plurality of heliostats. Each heliostat tracks to reflect light to a target on a tower or an aiming point. The heliostats can be arrayed in any suitable manner. For example, heliostat spacing and positioning can be selected to provide optimal financial return over a life cycle according to predictive weather data and at least one optimization goal such as total solar energy utilization, energy storage, electricity production, or revenue generation from sales of electricity.

The solar receiver can receive reflected and optionally concentrated solar radiation and convert the reflected solar radiation to some useful form of energy, such as heat or electricity. The receiver can be located at the top of the receiver tower or at some other location. For example, an intermediate reflector may be used to direct concentrated light received to a receiver at ground level.

Figure 1:
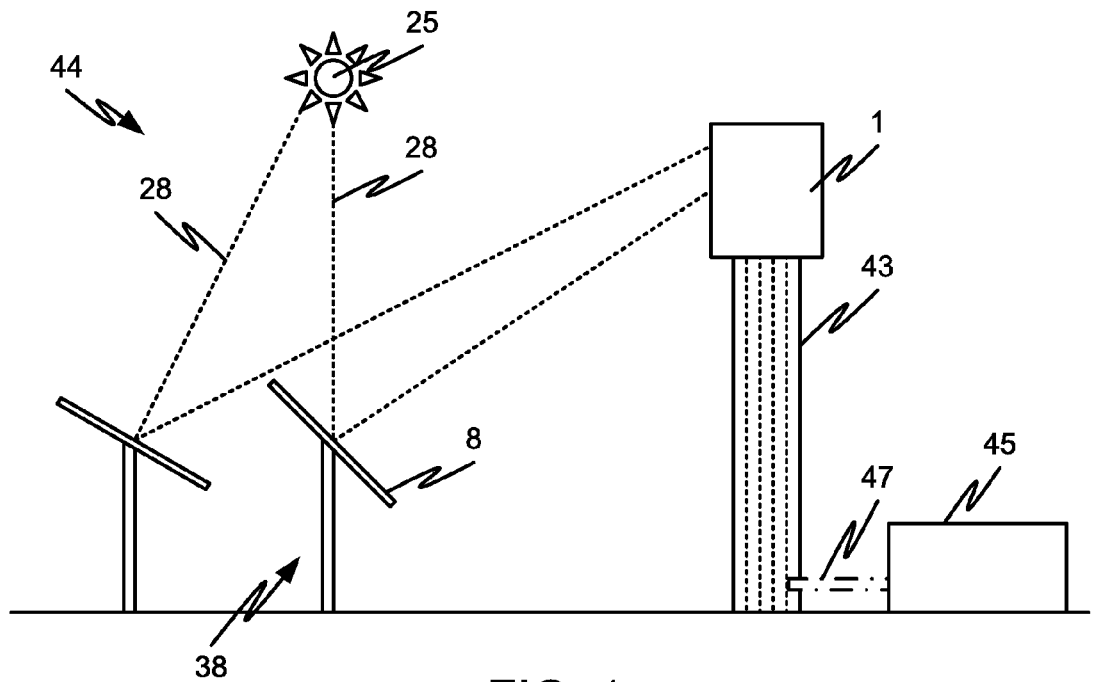
FIGS. 1 and 2 are diagrammatic elevation views of a plurality of heliostats and a central power tower in accordance with different embodiments of the invention.
Figure 2:
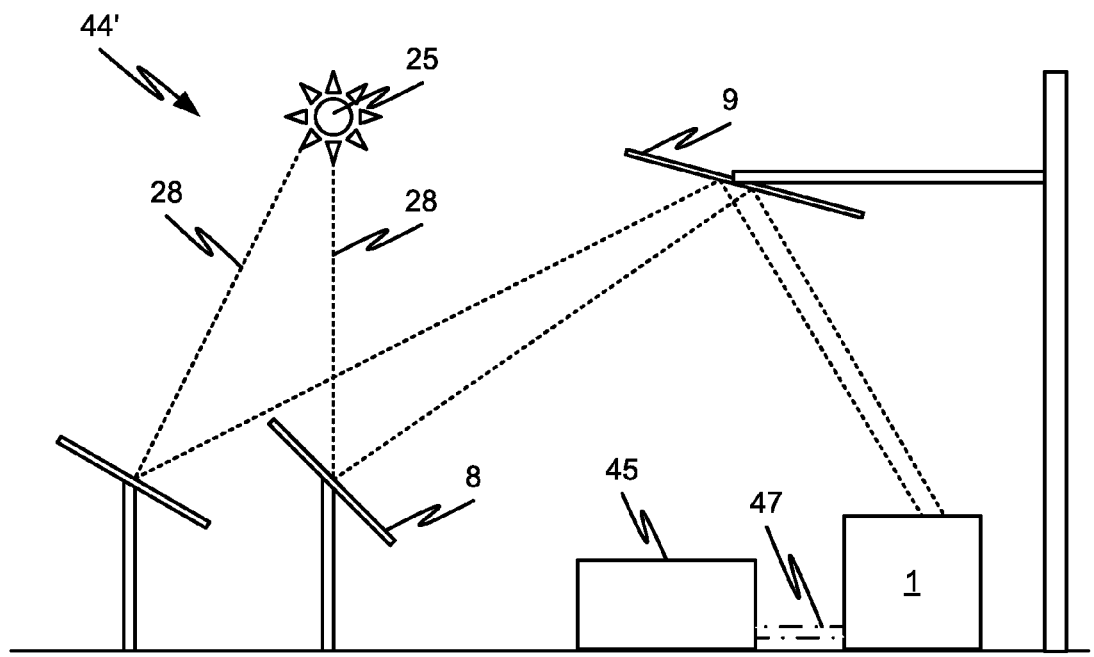

Referring now to the figures and in particular to FIG. 1, an example of a central receiver system 44 is shown. The system 44 can include heliostats 38 with mirrors 8 that reflect incident solar radiation 28 onto a receiver 1. The heliostat-mounted mirrors 8 are capable of tracking the apparent movement of the sun 25 across the sky each day in order to maintain the reflective focus in the direction of the receiver 1 as the angle of the incident radiation 28 changes. The receiver 1 can be located atop a tower 43. In an alternative example of system 44', shown in FIG. 2, receiver 1 can be located on the ground, and the heliostat-mounted mirrors 8 reflect solar radiation onto one or more suspended mirrors 9 which further reflect the radiation onto the receiver 1.

A fluid (not shown) can be heated in the receiver 1 and conveyed via a pipe 47 or other conveyance device (e.g., truck, train, pipeline, etc.) for contemporaneous or later use, for example, to generate power in an electric power generating plant 45. The heated fluid can also be stored in a minimal heat loss storage unit (not shown) for later use by the electric power generating plant 45, for example, when solar insolation levels are below a minimal value. The heat in the fluid can be used in the generation of electricity by, for example, a turbine employing a Rankine, organic Rankine, or Brayton cycle. The fluid may be a working fluid or intermediate heat transfer fluid (e.g., molten salt) used to heat a working fluid. A thermal storage that includes the heat transfer fluid and/or another thermal mass or phase change material may be included in the fluid conveyance.

At times, reflected and/or concentrated radiation by the heliostat-mounted mirrors may not be efficiently employed and/or received by the receiver. For example, the distribution of reflected solar radiation around an intended aiming point on a target surface may be unpredictable or may be graded (for example, its cross-beam intensity distribution may be Gaussian). As such, in attempting to achieve a target uniformity over the surface of the receiver, and in concomitantly directing the focus of some heliostats near the receiver edges, some spillage of concentrated light may occur. That is, some of the reflected radiation aimed near the edges of the boiler misses the receiver.

In the embodiment 101a of a combined dual mode receiver device shown in FIGS. 3A to 3F, one or more photovoltaic converters 105 are arranged adjacent the edges of a thermal portion of the receiver 102a (the term "receiver," by itself, generally being used herein to refer to the thermal portion of the receiver which may be a boiler, heat exchanger, superheater, or other device used for converting sunlight to heat). Concentrated sunlight that misses the receiver hits the one or more photovoltaic converters 105. In this way, the so called spillage is converted into usable electrical energy. The one or more photovoltaic converters 105 may be an array of photovoltaic cells employing any crystalline or noncrystalline medium, a thermopile, photochemical conversion device, or other converter.

Furthermore, the size of the heliostat field in a solar tower system for a given rated electrical output may not be generally determined in accordance with the maximum expected level of solar radiation but rather by an optimization of expected financial return projected from the system when taking into account the expected distribution of solar radiation over the course of a year as well as other factors which can include, for example, differential tariffs. The result of this optimization is that there are some hours of peak solar radiation during the year in which the total energy available to the solar field exceeds the rated capacity. As a result of optimizing for financial return, during such peak hours, some heliostats are defocused from the tower to avoid exceeding the rated capacity of the system or one of its components such as a boiler, turbine or transformer, or alternatively to avoid exceeding an output rating mandated by contract or by regulation. This practice is typically referred to as 'dumping', and the energy not captured by the system as a consequence is called 'dumped' energy.

In embodiments, reflected solar radiation that would otherwise be dumped is captured by an alternate receiver or receiver portion employing a second energy conversion mode. For example, concentrated sunlight dumped onto a photovoltaic converter is directly converted to electricity. Such a photovoltaic converter may be located near or adjacent the thermal receiver to minimize any required displacement of heliostats for dumping purposes. The output derived from the supplemental converters may be captured and combined with existing systems employed in the thermal-electric generation of power.

The interception of concentrated sunlight resulting from dumping and spillage can be provided by the same energy converter. For example, embodiments in which photovoltaic converters are advantageously located adjacent the thermal receiver can have sufficient area to be usable for capturing concentrated sunlight that is dumped.

For example, a solar power system can include a receiver or receiver section in which a working fluid is heated for conversion in an electric power generating plant and a supplemental receiver or receiver section capable of efficient photovoltaic conversion of solar radiation to electricity at concentrations of more than one hundred suns ("high concentration module"). The two receivers or receiver sections can be integrated into a common receiver or separated from each other. The photovoltaic receiver or receiver section can provide efficient photovoltaic conversion, for example, at concentrations of more than one hundred suns. The photovoltaic receiver section can incorporate multi-junction or multi-bandgap photovoltaic cells, a suitable example of which is the EMCORE T1000 Triple-Junction High-Efficiency Solar Cell available from EMCORE Photovoltaics of Albuquerque, N. Mex.

In another example, a solar power system can include a receiver or receiver section in which a working fluid is heated for later use in an electric power generating plant and a receiver or receiver section capable of efficient photovoltaic conversion of solar radiation to electricity at concentrations of under fifty suns ("low concentration module"). The two receivers or receiver sections can be integrated into a common receiver or separated from each other. The photovoltaic receiver or receiver section can provide efficient photovoltaic conversion at concentrations of less than one fifty suns is preferably one that incorporates single-junction photovoltaic cells made of or based upon crystalline silicon, a suitable example of which is an Artisun™ silicon cell available from Suniva, Inc., of Atlanta, Ga.

In still another example, a solar power system can include a receiver with pipes or tubes, or the like, or alternatively a cavity receiver, in which a working fluid is heated for later use in an electric power generating plant and solar modules for photovoltaic conversion of solar radiation to electricity at concentrations of less than fifty suns ("low-concentration modules"). The low-concentration solar modules can include photovoltaic cells made from or based on crystalline silicon. The receiver can also optionally include solar modules for photovoltaic conversion of solar radiation to electricity at concentrations of more than one hundred suns ("high-concentration modules"). The high-concentration solar modules preferably include multi-junction or multi-bandgap photovoltaic cells. In some embodiments the working fluid includes pressurized steam, and in alternative embodiments the working fluid includes air, carbon dioxide, a metal, or a salt.

The solar receiver section for heating a working fluid can include pipes or tubes, or the like, or alternatively a cavity receiver. The working fluid can include pressurized steam. Alternatively, the working fluid can include air, carbon dioxide, a metal or a salt. Examples of suitable receivers or receiver sections in which a working fluid is heated include any of the receivers described in International Application Publication Nos. WO-2008/154599, filed Jun. 11, 2008, and WO-2009/015388, filed Jul. 28, 2008, the entireties of which are hereby incorporated by reference. Another example is a so-called cavity receiver in which a fluid in gaseous phase is heated, for example, one described in U.S. Pat. No. 4,633,854, filed Nov. 26, 1985, which is also incorporated by reference.

For purposes of clarity, any receiver (or section of a receiver) in which a fluid is heated will be called a "boiler" in this specification even though in many embodiments the term is used with reference to heating a fluid in a manner not consistent with the usual definition of the word boiler. Examples of such embodiments include heating a fluid to a temperature below its boiling point, heating a fluid in a superheater or in a supercritical steam generator, or heating a gaseous fluid in a cavity receiver.

In a first mode of operation, heliostats can be aimed so as to focus reflected solar radiation on an external surface of the boiler receiver (in the case of two separate receivers—one a boiler and the other photovoltaic—on a tower) or of the boiler portion of a dual-function receiver. In this first mode of operation, the presence of the photovoltaic modules captures at least a portion of the radiation that would have become spillage, and converts it efficiently to electricity. The radiation hitting the boiler near the upper and/or lower edges may be at a concentration of at least one hundred suns and as high as one thousand suns. As such, the solar modules may need to be configured so as to efficiently convert solar radiation at such high concentrations, i.e., include multi-junction or multi-bandgap photovoltaic cells. This is particularly true when aiming of the heliostats is done in a way that seeks to provide a uniform flux distribution over the face of the thermal receiver. Since intensity of each heliostat's beam falls off progressively from the central axis of the beam, the intensity just beyond the edge of the thermal receiver may be as high as the intensity just inside the edge of the thermal receiver. However, some designs may not provide for critical uniformity in this way. For example, uniformity may be critical in some systems for superheating receivers, but not for boiling receivers. Or some systems may operate well below the thermal limits of the boiler and be able to tolerate a significant fall off in flux from well within the face of the thermal receiver toward the edge such that the intensity of spilled concentrated sunlight is much lower than the peak. In such cases, it is possible instead to use modules containing single-junction photovoltaic cells made of or based upon crystalline silicon for converting spillage-bound radiation to electricity.

In a second mode of operation, generally applied during periods of peak solar radiation, some of the heliostats in a solar power system are defocused from the boiler (i.e., are not aimed to reflect radiation onto the boiler) and instead are focused on the photovoltaic receiver or receiver section. Therefore at least some of the solar energy that would otherwise have been dumped is converted to electricity.

As shown in FIGS. 3A-3B, a receiver 101a can include a star-shaped boiler 102a in which a fluid conveyed in vertical pipes (not shown) in a boiler 102a with optional external surfaces 103a is heated by the incidence of reflected solar radiation on the external surfaces 103a. The receiver 101a additionally includes one or more photovoltaic converters 105, which may incorporate multi-junction photovoltaic cells or single-junction crystalline silicon cells, depending on the desired concentration of reflected sunlight designed to impinge upon the modules. In another example, not illustrated, the one or more photovoltaic converters 105 can be positioned beneath rather than above the fluid-heating section of the receiver. In yet another example of a receiver 101b illustrated in FIGS. 3C-3D, there can be multiple sets of one or more photovoltaic converters 105, one positioned above the fluid-heating section 102b (boiler) and another below. In still another example of a receiver 101c illustrated in FIGS. 3E-3F, there can be a first boiler 102c and a second boiler 102d, one above the other, with one or more photovoltaic converters 105 interposed between them. Various shapes for boiler 102 are shown in FIGS. 3A-3F, for example, star-shaped, cylindrical and polygonal. However, the shape of the boiler is not limited to the illustrated shapes. For example, the boiler may be oval, elliptical, rectangular or any other shape which optimizes an operating goal such as maximum conversion of solar energy to electricity or minimum cost per unit of energy. The boiler can optionally have fins or other appendages. Similarly, the shape of the photovoltaic section need not be cylindrical, but can also be star-shaped, rectangular, polygonal, or any other shape which optimizes an operating goal such as maximum conversion of solar energy to electricity or minimum cost per unit of energy.

The photovoltaic modules may be constructed using any of several technologies. Since some photovoltaic modules have temperature efficiency curves, their efficiency may be reduced at elevated temperatures. Moreover, radiation that is too intense may damage the photovoltaic modules. Accordingly, the photovoltaic module may be provided with a fail-safe device for controlling the temperature of the photovoltaic module in the event of a rapid (undesired or unintentional) increase in flux. In this way, the photovoltaic device can protect itself and provide the heliostat control system time to correct the flux distribution leading to the high intensify on the photovoltaic converter.

Figure 3G:
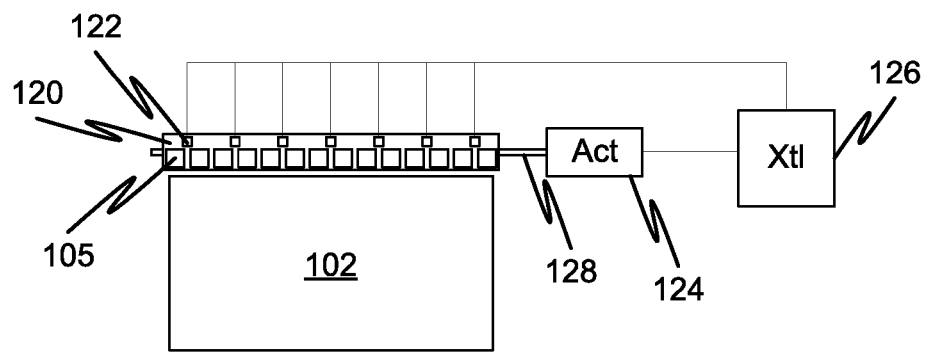
FIG. 3G is an elevation view of a receiver with a repositionable array of photovoltaic elements.
Figure 3H:
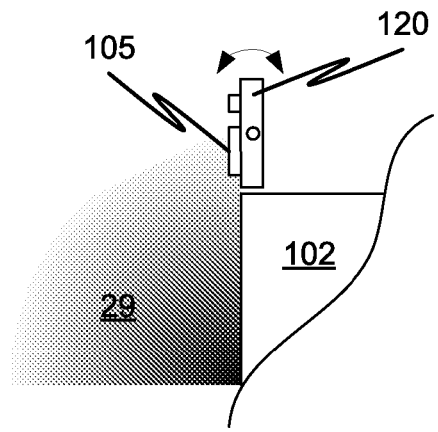
FIGS. 3H-3K are cross-sectional views of different positions of an array of photovoltaic elements.
Figure 3I:
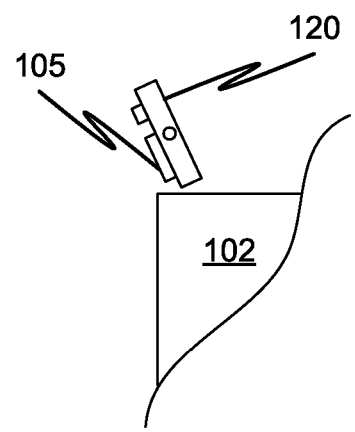
Figure 3J:
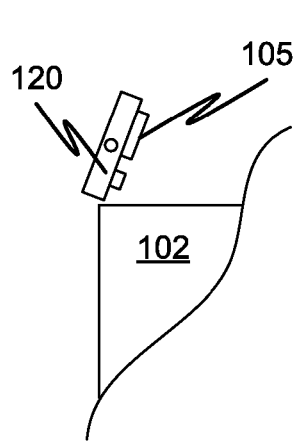
Figure 3K:
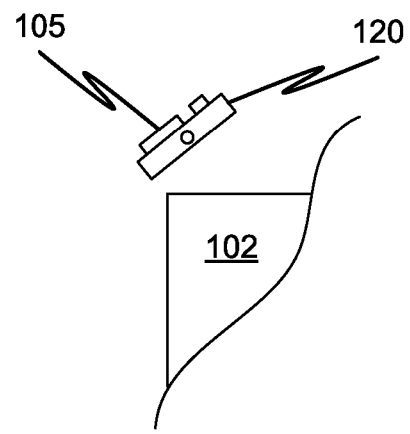

In an example of a fail-safe device, the temperature of the photovoltaic module is maintained by repositioning the photovoltaic module to change illumination conditions thereon. FIGS. 3G-3K illustrate a boiler 102 with adjacent one or more photovoltaic converters 105 arranged on a platen 120. The platen 120 may include one or more temperature sensors 122. When a temperature threshold is measured by the one or more temperature sensors 122, a controller 126 can control an actuator 124, which repositions the platen 120 via mechanism 128 to cool or protect the one or more photovoltaic converters 105. In normal operation, shown in FIG. 3H, the platen 120 may dispose the photocells to receive spillage from the incident radiation 29 on the boiler 102. The platen 120 may be rotated, for example, to put the one or more photovoltaic converters 105 in a position to take advantage of other solar insolation conditions. Such conditions may include a condition where the heliostats focus directly on the solar cells (FIG. 3I) or when the solar cells directly receive incident solar radiation (FIG. 3K). When temperature conditions dictate, the platen 120 may be rotated to place the solar cells in a protected mode (FIG. 3J) which prevents further irradiation of the one or more photovoltaic converters 105 such that its temperature may be mitigated.

Figure 4A:
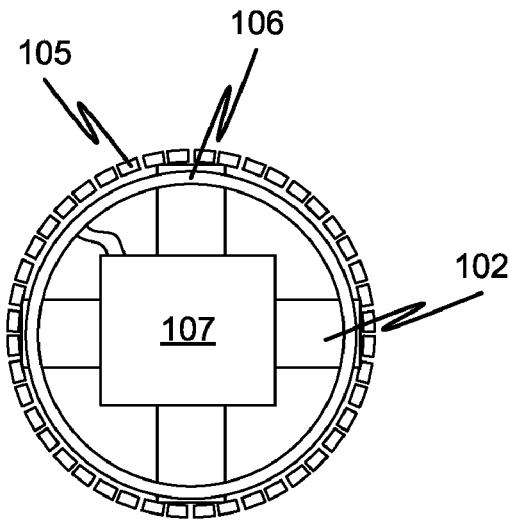
FIGS. 4A and 4B are plan and elevation views, respectively, of a receiver with an array of photovoltaic elements and a cooling system.
Figure 4B:
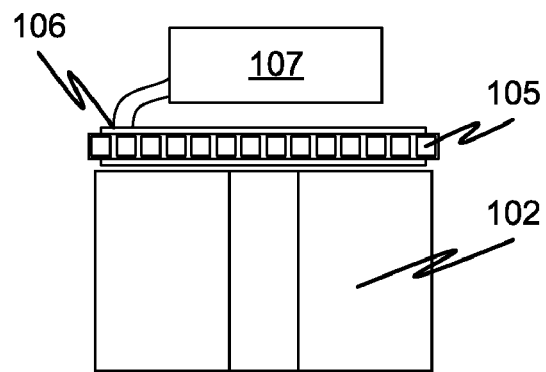

In another example of temperature control of the one or more photovoltaic converters 105, a receiver also includes a cooling system for removing excess heat from solar modules. As illustrated in FIGS. 4A-4B, a receiver includes a boiler 102 and a one or more photovoltaic converters 105, a cooling pipe 106 in which is conveyed a fluid for removing heat from the one or more photovoltaic converters 105, and a radiator 107. A controller (not shown) and temperature sensors (not shown) can be used to regulate operation of the radiator to maintain a desired temperature of the one or more photovoltaic converters 105.

Figure 4C:
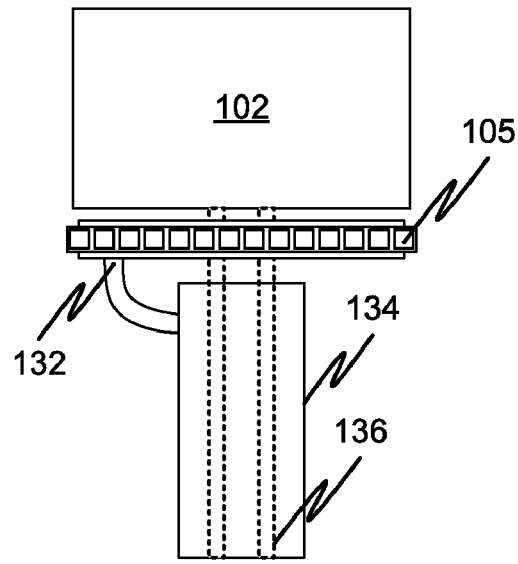
FIG. 4C is an elevation view of a receiver with an array of photovoltaic elements and a fluid preheater.

Even though photovoltaic cells have the ability to convert sunlight directly into electricity, the photovoltaic cells may have limited efficiency. Thus, at least some of the solar energy directed on the photovoltaic converters that is not converted to electricity may instead be converted to heat energy and discarded to the environment or temperature control mechanisms. According to a contemplated embodiment, the waste heat of the photovoltaic converters is captured and employed in the heating of the working fluid. As shown in FIG. 4C, a receiver with a boiler section 102 has one or more photovoltaic converters 105 arranged in the same tower. Solar energy incident on the one or more photovoltaic converters 105 is partly converted to electricity and partly absorbed as heat in the one or more photovoltaic converters 105. A cooling pipe 132 removes heat from the photovoltaic converters 105 and transfers it to a heat transfer module 134 in thermal communication with heat transfer or working fluid pipes 136 input to boiler 102. Thus, the heat transfer module 134 serves to preheat the heat transfer or working fluid before entering the boiler 102.

At other times, focused solar radiation may be unused due to insolation conditions, for example, reflection and occultation losses. In such scenarios, energy conversion modes can be provided in receivers at alternate focusing locations so as to increase and/or maximize electricity generation based on given insolation conditions. Such a solar power generation system can also be advantageously used when a particular receiver requires dumping, but another receiver may not require dumping.

For example, a solar power generation system can include multiple towers and multiple fields of heliostats. The heliostats can be configured to change their focus from tower to tower in accordance with instructions received from a control system and/or system operator. At least one tower can include a receiver in which a fluid is heated for later use in an electric power generating plant, and at least another tower can include a receiver in which solar energy at a concentration of at least one hundred suns is converted to electricity in photoelectric modules. As previously noted, the photoelectric modules can include multi-junction or multi-bandgap photovoltaic cells. A controller can be provided to control the heliostats and their respective aiming points. The controller may alter the aiming points of the heliostats responsive to at least one of a radiation dumping condition, a cosine loss condition, a heliostat occultation condition, a receiver uniformity condition, a solar insolation condition, an electricity production optimization condition, and a revenue optimization condition.

Thus, heliostats can be defocused from a tower with a boiler and aimed at a tower with photovoltaic converters in order to capture energy that would have been otherwise dumped. Additionally, heliostats can be defocused from a boiler in a first tower and aimed at one or more photovoltaic converters in a second tower in order to utilize incident solar radiation more efficiently, in that cosine losses in a particular situation can be reduced for a first solar angle by servicing one tower and then switching to a different tower for a different solar angle, as illustrated in FIGS. 5A-5B and 6A-6B.

Figure 5A:
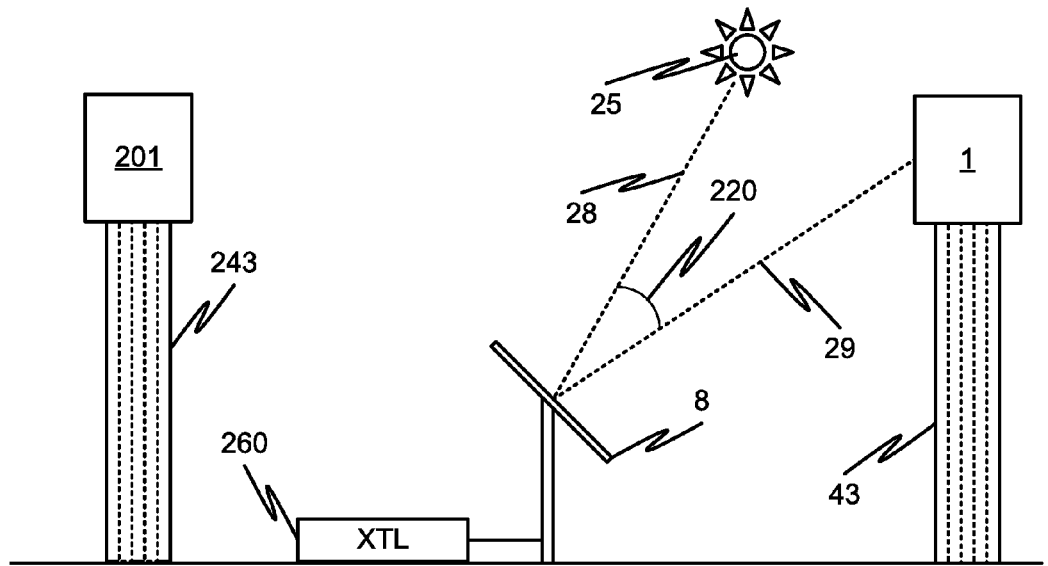
FIGS. 5A, 5B, 6A, and 6B are diagrammatic elevation views of a heliostat and a plurality of power towers illustrating the incidence and reflection angles of solar radiation with respect to focusing alternately on each of the towers.
Figure 5B:
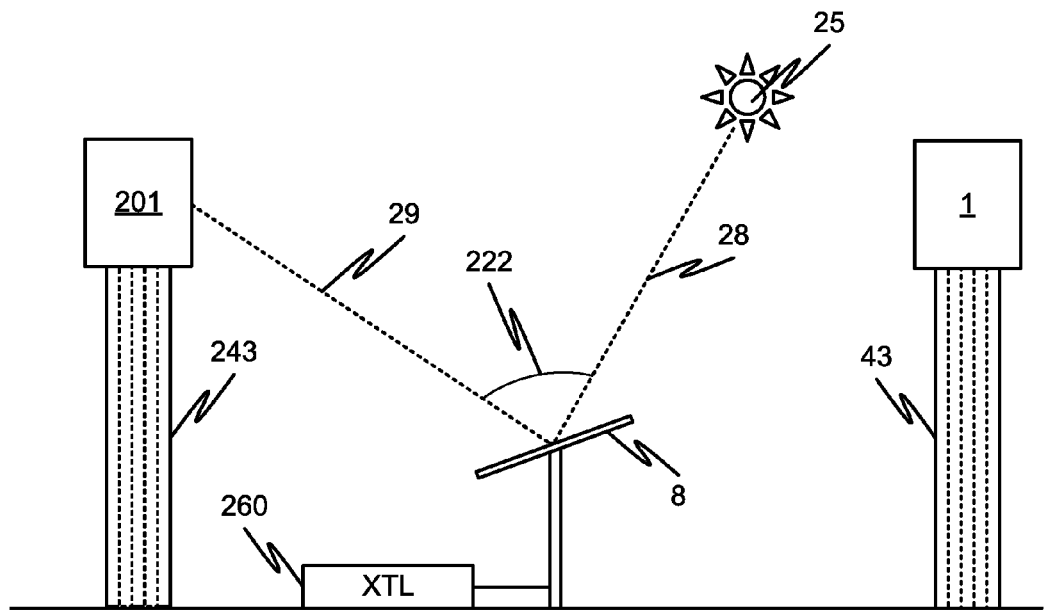

Cosine losses occur because the effective reflection area of a heliostat is reduced by the cosine of one-half of the angle between incident radiation and reflected radiation. In FIG. 5A heliostat-mounted mirror 8 is directed to reflect incident solar radiation 28 on boiler/receiver 1 on a first tower 43, resulting in an angle 220 between the incident radiation 28 and reflected radiation 29. As can be seen in FIG. 5B, if heliostat-mounted mirror 8 were to be directed by controller 260 to reflect instead onto photovoltaic receiver 201 on a second tower 243, the resulting angle 222 between incident radiation 28 and reflected radiation 29 would be larger and cosine losses would be accordingly larger. Therefore, in this situation, switching focus would likely not serve an optimization goal.

Figure 6A:
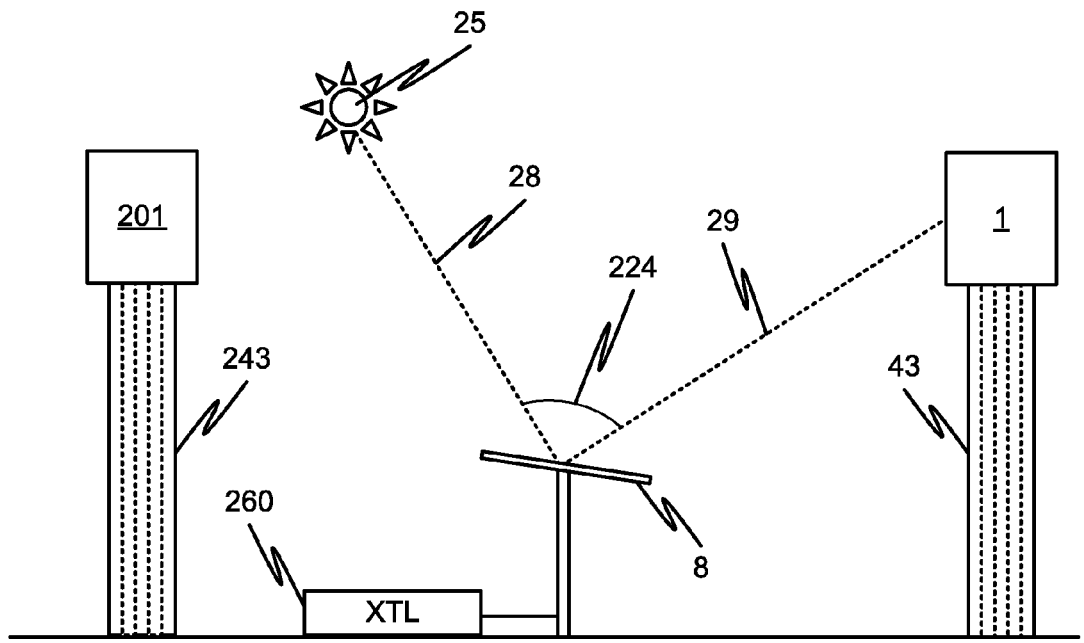
Figure 6B:
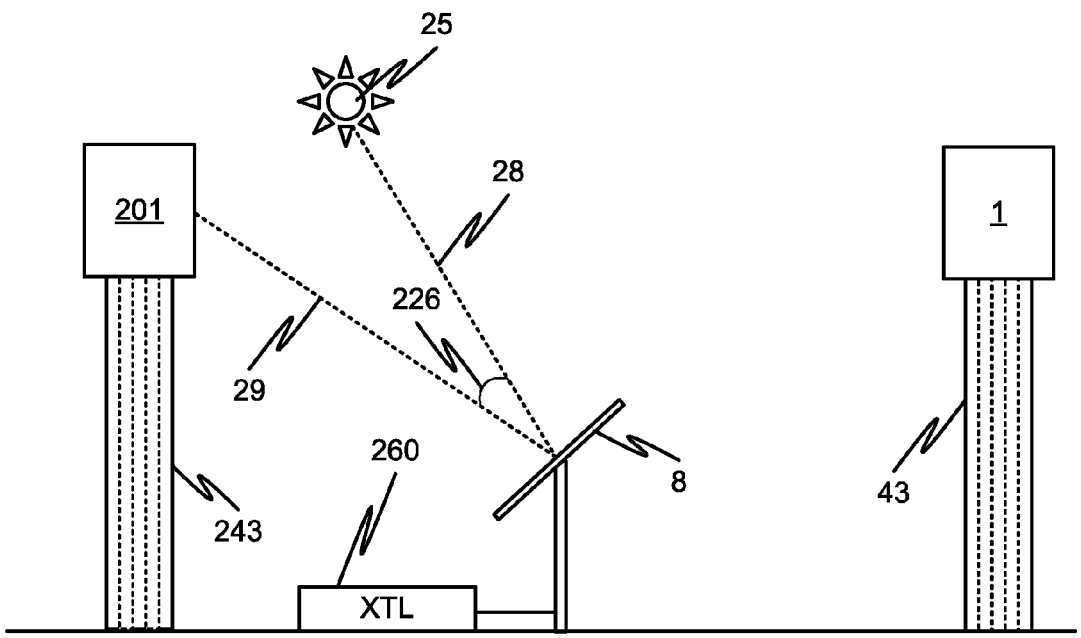

FIGS. 6A-6B show the situation of a different solar angle, and in this situation larger cosine losses are incurred if focus remains on boiler/receiver 1, and smaller cosine losses can be achieved if focus is switched to photovoltaic (i.e., solar module) receiver 201. It can be seen in FIGS. 6A-6B that with this different solar angle the resulting angle 226 (FIG. 6B) between incident radiation 28 and reflected radiation 29 would be smaller than angle 224 (FIG. 6A) and cosine losses would be accordingly smaller. With the smaller cosine losses, a larger proportion of solar energy will be retained by the system and converted to a usable form, thereby increasing electricity production and revenue generation, and therefore switching focus from boiler/receiver 1 to photovoltaic receiver 201 would serve at least one optimization goal such as maximizing electricity production or revenue generation.

Heliostats can also be redirected by controller 260 or an operator from a boiler receiver to a photovoltaic receiver to reduce the effects of occultation, i.e., shadowing and blocking. Shadowing occurs at low sun angles when a heliostat casts its shadow on a heliostat located behind it and therefore, not all the incident solar flux reaches the mirror. Blocking occurs when a heliostat in front of another heliostat blocks the reflected flux on its way to the receiver. Alleviation of occultation losses by redirecting mirrors from one receiver to another can be part of a periodic and optimally predictive optimization of a system, field, or field subset, which takes into account not only alleviation of occultation losses but also cosine losses, atmospheric attenuation, spillage and at least one system optimization goal.

Figure 7A:
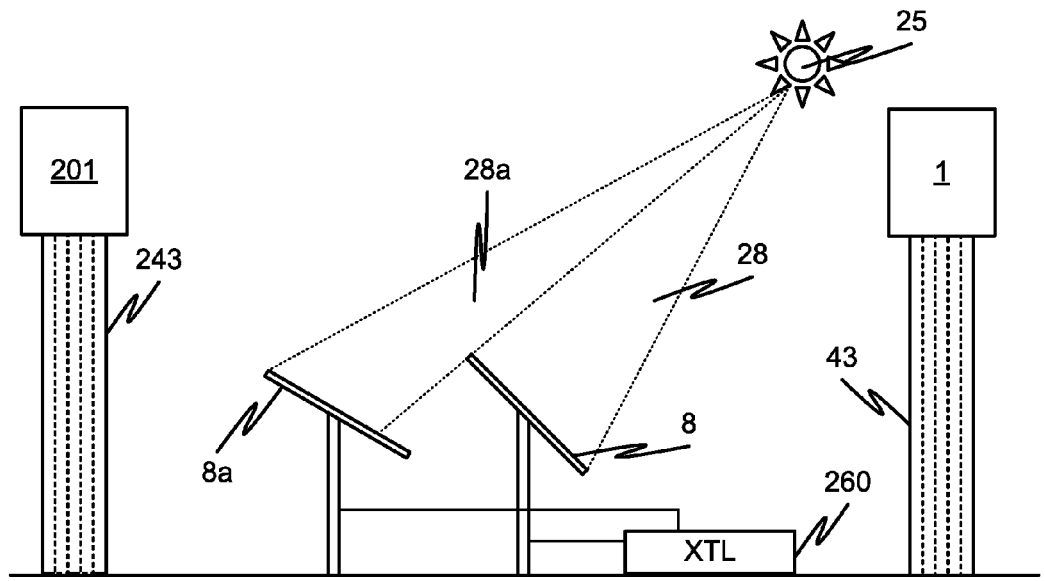
FIGS. 7A and 7B are diagrammatic elevation views of heliostats and power towers illustrating the alleviation of shadowing with respect to focusing alternately on each of the towers.
Figure 7B:
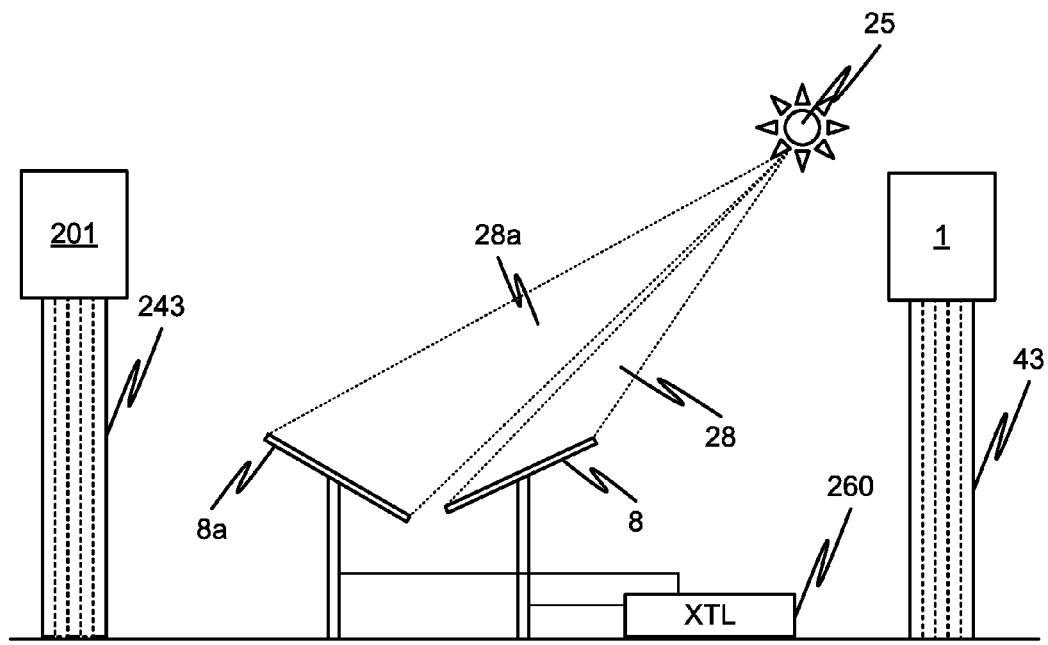

FIGS. 7A-7B illustrate how switching focus from the boiler receiver to a photovoltaic receiver can alleviate shadowing. If both heliostat-mounted mirrors 8 and 8a are focused on boiler/receiver 1 on a first tower 43, as in FIG. 7A, then at certain sun angles mirror 8 will cast a shadow on mirror 8a, i.e., part of solar radiation 28a will not reach mirror 8a because of mirror 8. An operator and/or computerized control system 260 can direct mirror 8 to switch to focus on a photovoltaic receiver 201 on a second tower 243, as shown in FIG. 7B, and thereby avoid or reduce shadowing on mirror 8a. Such control may also take into account system optimization goals and other factors such as distances, atmospheric attenuation, spillage and added cosine losses.

Figure 8A:
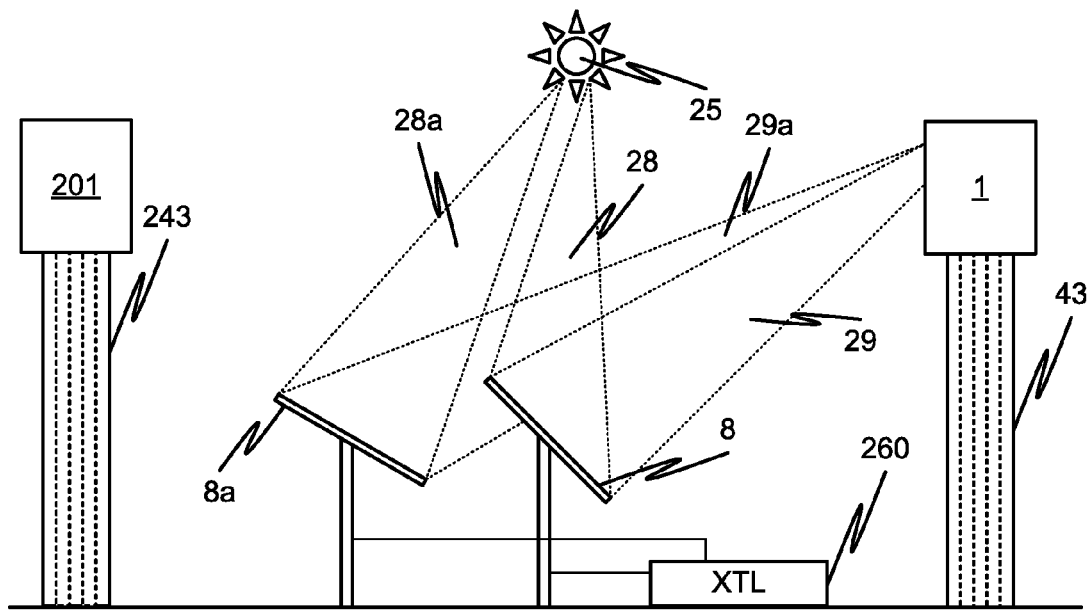
FIGS. 8A and 8B are diagrammatic elevation views of heliostats and power towers illustrating the alleviation of blocking with respect to focusing alternately on each of the towers.
Figure 8B:
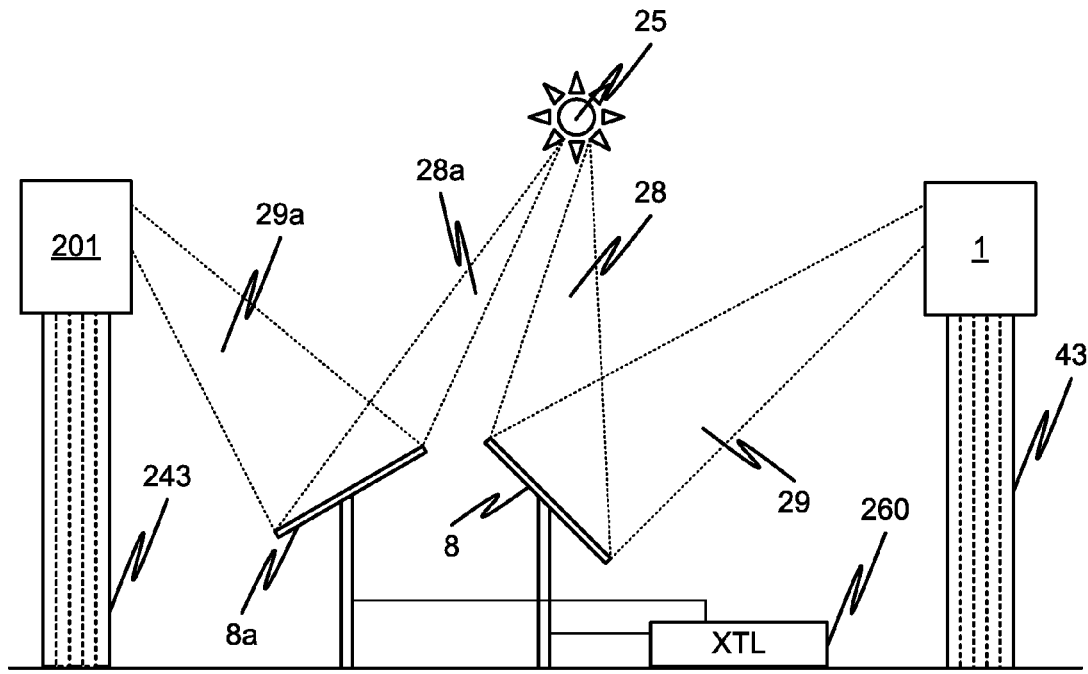

FIGS. 8A-8B illustrate how switching focus from one receiver to another can alleviate blocking. If both heliostat-mounted mirrors 8 and 8a are focused on boiler/receiver 1 on first tower 43, as in FIG. 8A, then at certain sun angles mirror 8 will block the reflected solar radiation 29a from mirror 8a. An operator and/or computerized control system 260 can direct mirror 8a to switch to a photovoltaic receiver 201 on a second tower 243 as in FIG. 8B and thereby avoid or reduce blocking. Such control may also take into account system optimization goals and other factors such as distances, atmospheric attenuation, spillage and added cosine losses. This mode of operation can allow for tighter spacing between heliostats since during periods of high shadowing or blocking some of the affected heliostats can be switched to an alternate tower.

In the foregoing discussion of multiple towers, only examples of switching from a boiler receiver to a photovoltaic receiver were described and illustrated, but the same principles apply to switching from a photovoltaic receiver to a boiler receiver, from one boiler receiver to another, from a boiler section in one tower to a photovoltaic section in another tower, from a photovoltaic section in one tower to a boiler section in another tower, from one photovoltaic receiver to another, or from one photovoltaic section to another, all in accordance with the objective of realizing one or more system optimization goal such as maximization of revenue, profit, electricity generation or system efficiency. Moreover, although only two towers are illustrated in the figures, greater than two towers are also possible, according to one or more contemplated embodiments.

In another example, a solar power tower system includes at least one fluid-heating tower and at least one photovoltaic tower. The system can additionally include at least one secondary reflector capable of reflecting radiation reflected by heliostats on one side of a tower substantially onto the other side, i.e., onto a portion of the receiver not in 'line of sight' from those heliostats.

Figure 9A:
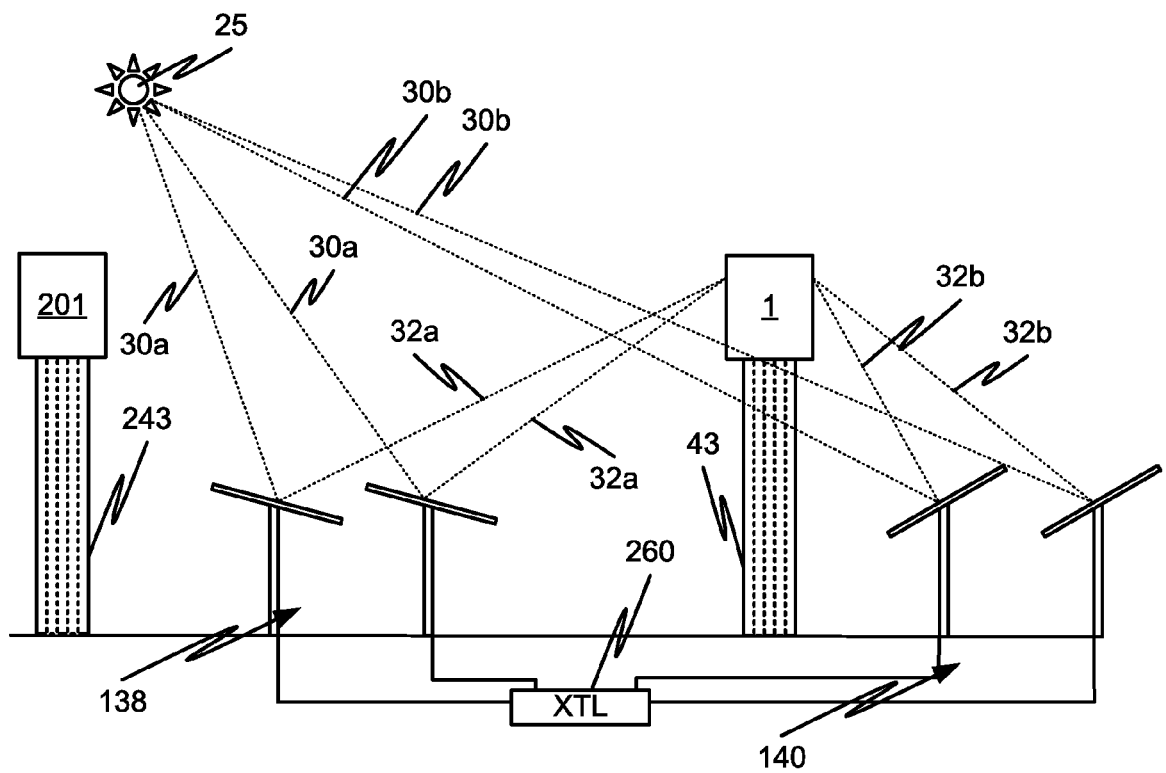
FIGS. 9A and 9B are diagrammatic elevation views of heliostats and power towers illustrating the implementation of a secondary reflector.
Figure 9B:
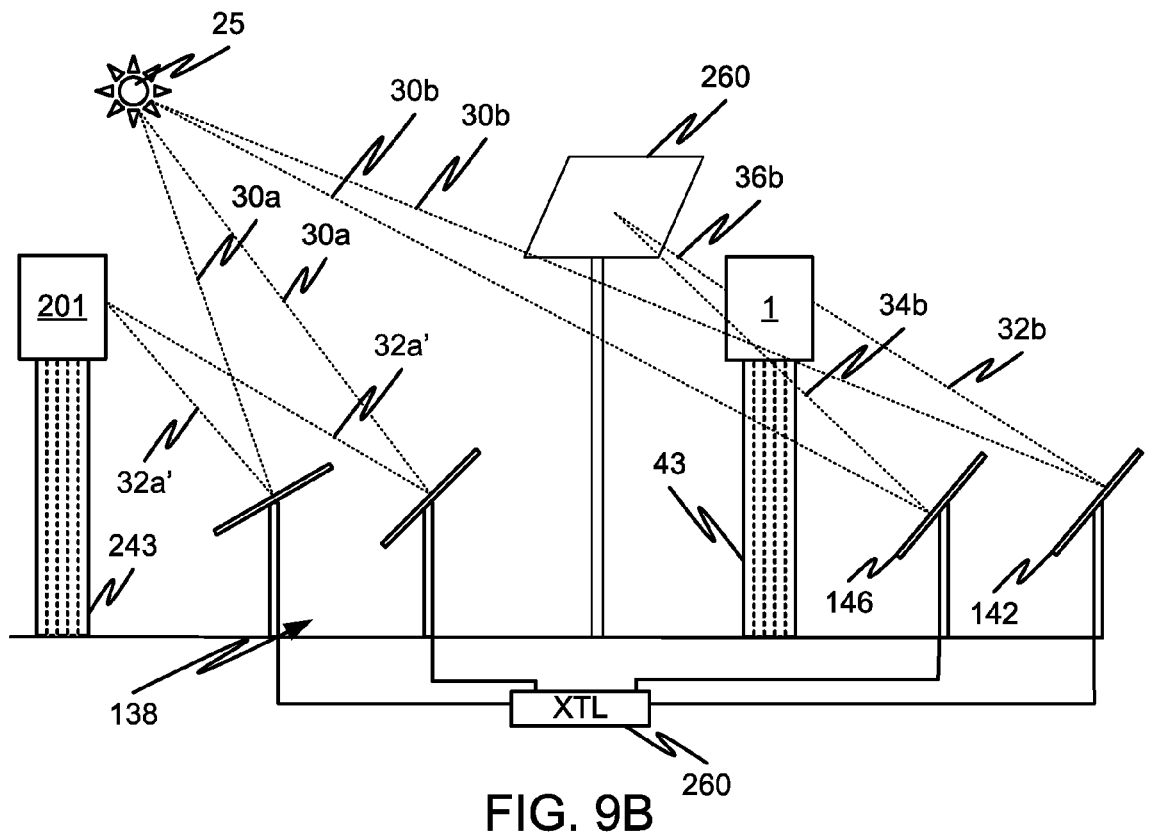

FIGS. 9A-9B illustrate the use of a secondary reflector in a solar power system. Referring now to FIG. 9A, radiation 28 from the sun 25 is incident on a group of heliostats 138 equipped with mirrors on one side of a tower, and also on a second group of heliostats 140 equipped with mirrors on the other side of the tower. The first group 138 to the left of first tower reflects the radiation 28 onto the boiler/receiver 1 on first tower with large cosine losses and therefore low efficiency, due to the relatively large angle between incident radiation 28 and reflected radiation 29. While these heliostats could be used more efficiently for reflecting light onto photovoltaic receiver 201 on second tower 243, as described elsewhere herein, it often happens that the system controller 260 cannot release the heliostats because the reflected insolation on the left side, however weak it may be, is needed for proper operation of and/or uniformity of illumination on the boiler/receiver 1. At the same time, the second group 140 reflects the radiation 30b onto the right side of the same boiler/receiver 1 with smaller cosine losses and therefore higher efficiency, due to the relatively small angle between incident radiation 30b and reflected radiation 32b. In this case it is possible that more reflected energy may be available on the right side of the boiler/receiver 1 than is required or desired.

FIG. 9B illustrates an advantage of the present embodiment. Secondary reflector 260, shown as installed atop a narrow pylon so as to minimize shadowing and blocking, can help to redistribute the energy available from heliostat group 140 on the right side of the tower and 'free up' heliostat group 138 on the left side to switch to photovoltaic receiver 201 on tower 243 where its energy can be used more efficiently (because of the smaller cosine losses). For example, in FIG. 9B heliostat 142 in heliostat group 140 can remain focused on the boiler/receiver 1 while heliostat 146 can focus on the secondary reflector 260. Incident insolation 30b is reflected by heliostat 146 as first reflected radiation 34b onto the secondary reflector 260, which reflects substantially all of the first reflected radiation 34b as second reflected radiation 36b onto the left side of the boiler/receiver 1. More energy can impinge on the left side of the boiler/receiver 1 in the second reflected radiation 36b than would accrue from heliostat mirrors in heliostat group 138 because of the high cosine losses of the latter. Instead, heliostat mirrors in group 138 can focus reflected radiation 32a' on the photovoltaic receiver 201 on tower 243, and total solar energy available to the overall solar tower system is increased by the presence of the secondary reflector 220. It should be clear to one familiar with the art of solar power towers that the left and right sides in these figures can be construed as east and west, respectively, or vice versa, and that the low sun angle is typical of the first and last hours of daily sunlight. Left and right can also be construed as north and south, with the low sun angle in the south being typical of winter days. Moreover, it should be obvious to one familiar with the art that a second secondary reflector can be provided so that one is available for an eastern heliostat field in the morning hours, for example, and a second one available for a western heliostat field in the late afternoon hours.

Figure 10:
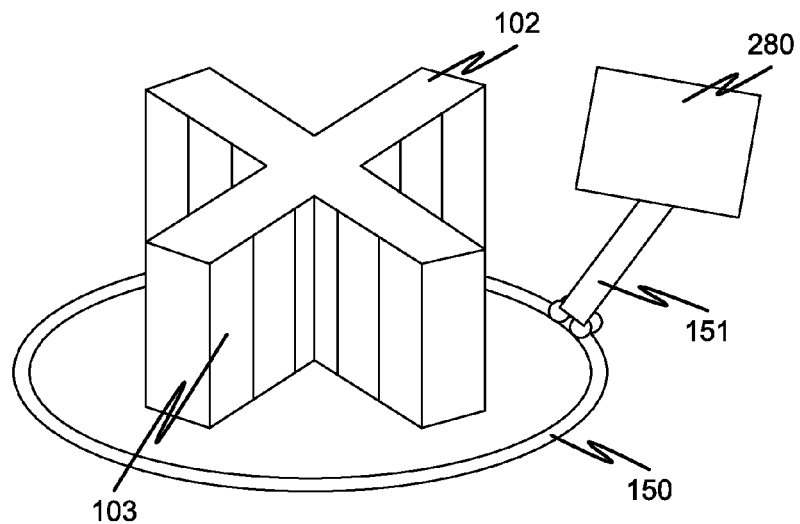
FIG. 10 is an isometric view of a solar receiver with a repositionable secondary reflector.

In another example, it is possible to deploy a secondary reflector capable of being moved to various sides of a receiver at various times of the day or in accordance with seasonal variation in sun position. FIG. 10 shows an example of a secondary reflector 280 with pivoting and moving capabilities. A secondary reflector 280 is mounted on a wheeled frame 151, which moves freely around the receiver 1 on track 150, in response to control instructions. The secondary reflector 280 is also capable of pivoting in two axes at the attachment point (not shown) to the wheeled frame 151.

In various contemplated modes of operation, heliostats can be aimed so as to focus reflected solar radiation directly on a photovoltaic receiver or receiver section, i.e., on a plurality of photovoltaic converters. As discussed above, distribution of reflected solar radiation around an intended aiming point on a target surface is approximately Gaussian. Because of heliostat aiming errors, beam shape, beam divergence and/or other factors, some of the reflected radiation aimed at the photovoltaic receiver misses the photovoltaic converters and hits a boiler which is positioned above and/or below the photovoltaic receiver, and where the absorbed radiation heats a fluid conveyed in a pipe, tube or the like. This mode of operation is applied generally in cases where the concentration of reflected radiation desired for the boiler is less than that desired for the photovoltaic receiver. An example of such a case is one in which steam is superheated or reheated in the boiler (or boilers) and a relatively low concentration, for example, less than about one hundred suns, is desired thereupon.

A photovoltaic converter employed in any of the receivers described herein can be provided with an optical concentrator for additional concentration of reflected solar radiation before it reaches the solar module. Optical concentrators can include lenses such as Fresnel lenses, and curved mirrors, but any optical element capable of concentrating light may be used.

Environmental conditions may adversely impact the efficiency of the boiler section of a thermal receiver. For example, prevailing wind patterns interacting with the surface of the boiler may increase heat loss due to convection. Accordingly, fins or ribs can be added to the boiler section to modify the airflow patterns around the boiler section so as to reduce and/or minimize thermal losses due to convection. Such fins or ribs can extended radially from the boiler section and are positioned where they can effectively reduce convective heat losses from the boiler section by disrupting normal airflow related to prevailing wind patterns. Moreover, the fins or ribs can be provided with one or more photovoltaic converters to capture reflected and/or concentrated solar radiation that may otherwise be lost or unused.

Figures 11A, 11B:
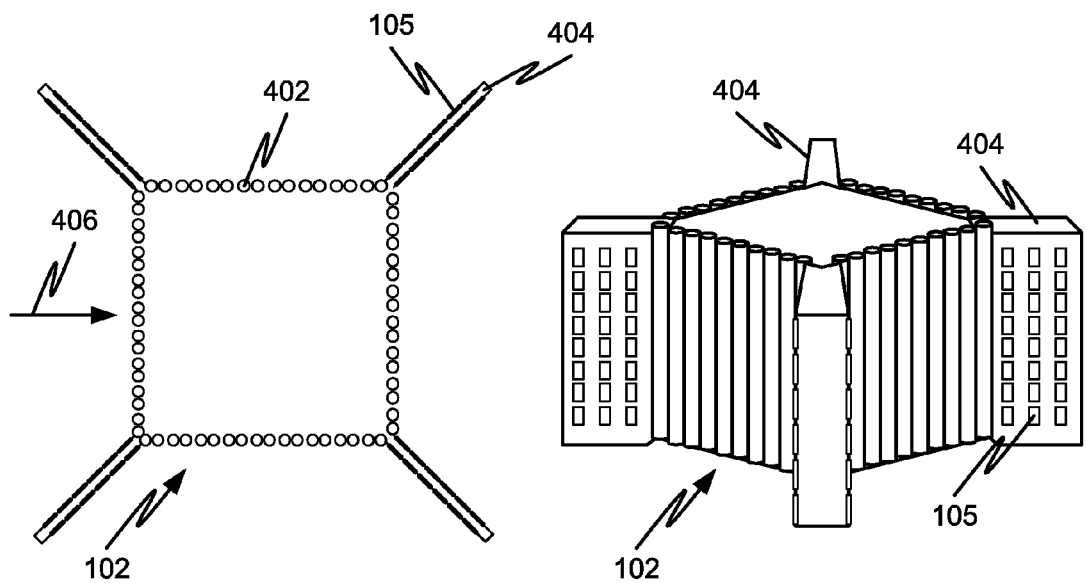
FIGS. 11A and 11B are plan and isometric views, respectively, of a square receiver with photovoltaic-element-containing projections.

For example, a receiver can include a boiler section which includes tubes, pipes, or the like, in which a fluid is heated, and additionally includes a photovoltaic section with one or more photovoltaic cells made of or based upon crystalline silicon. The photovoltaic section can be configured and disposed so as to produce electricity from reflected radiation that misses the boiler section, i.e., spillage. The one or more photovoltaic cells can be arranged on fins or ribs extended radially from the boiler section, as shown in FIGS. 11A-11B.

The receiver can include a square boiler section 102 and fins 404 extending radially from the boiler section 102 at its corners. One or more photovoltaic converters 105 provided on either of the sides of each of the fins 404 are positioned so as to receive reflected radiation that may miss the boiler section 102. The boiler section 102 can be comprised of individual pipes or tubes 402. Exterior surfaces of the pipes or tubes 402 may form the exterior surface of the boiler 102, or, alternatively, additional exterior surfaces (not shown) can be provided in thermal contact with pipe or tubes 402 to receive the radiation reflected by the heliostats.

In operation, the photovoltaic converters may regularly receive reflected radiation at a concentration of, for example, less than fifty suns. Depending on the specifications of the photovoltaic cells, it may be desirable to limit the reflected radiation to a lower concentration, for example, less than twenty suns. A cooling system (not shown) can be provided to remove excess heat from solar modules, for example by circulating a fluid along the back side of each module, i.e., the side not facing reflected radiation.

When the boiler section 102 is arranged with prevailing winds, as shown by arrow 406, from the east to the west, fins 404 can serve to decrease convective heat losses from turbulent airflow that would otherwise be closer to the boiler section 102 in the area to the east of the boiler 102. Fins 404 can also decrease convective heat losses from boundary-layer turbulence in each of the areas north and south of the boiler 102.

Figure 12:
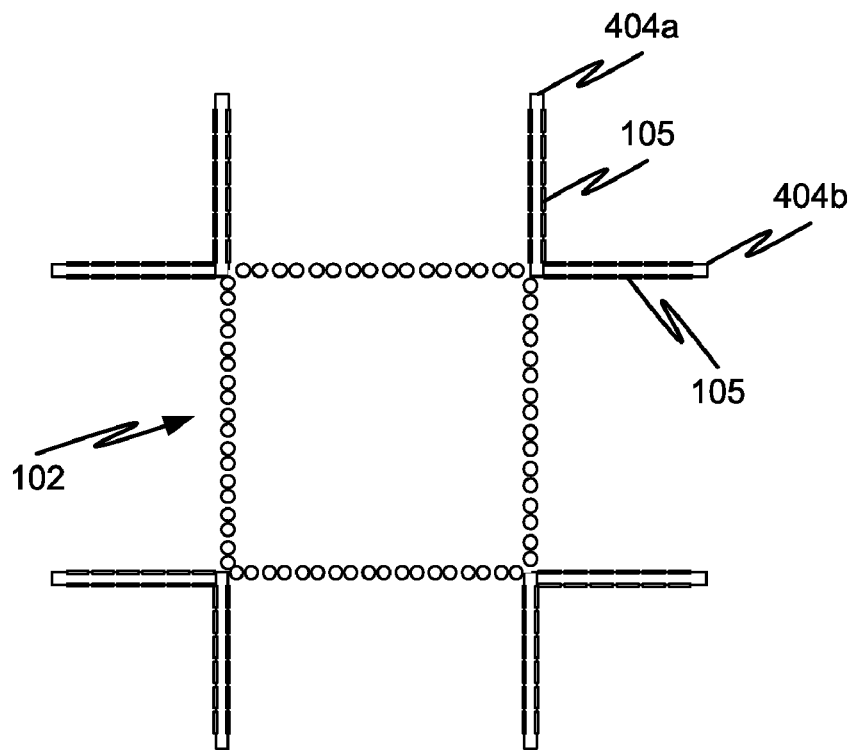
FIG. 12 is a plan view of a square receiver with an alternate arrangement for photovoltaic-element-containing projections.

FIG. 12 shows an alternative arrangement for fins 404. In the arrangement of FIG. 12, a first fin 404a and a second fin 404b are provided at each corner. Each fin 404a, 404b can be provided with one or more photovoltaic converters 105, as described above. While the fins 404a, 404b are shown orthogonal to each other, other angles and/or configurations with respect to the boiler 102 are also contemplated.

Figure 13A:
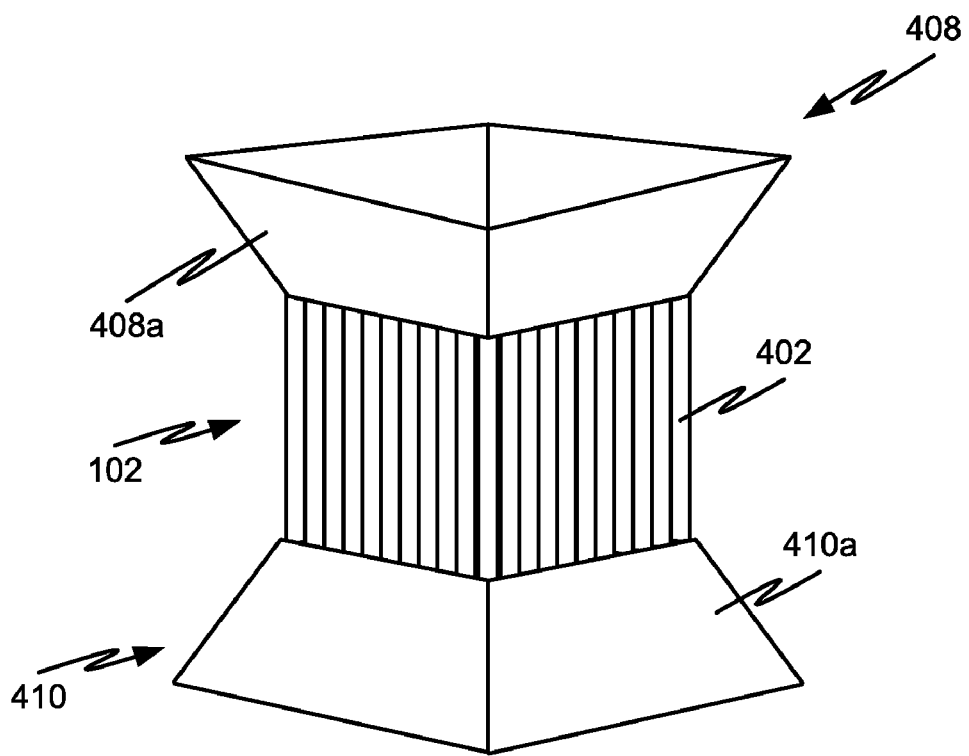
FIGS. 13A and 13B are isometric and elevation views, respectively, of a receiver with a pair of photovoltaic-element-containing skirts.
Figure 13B:
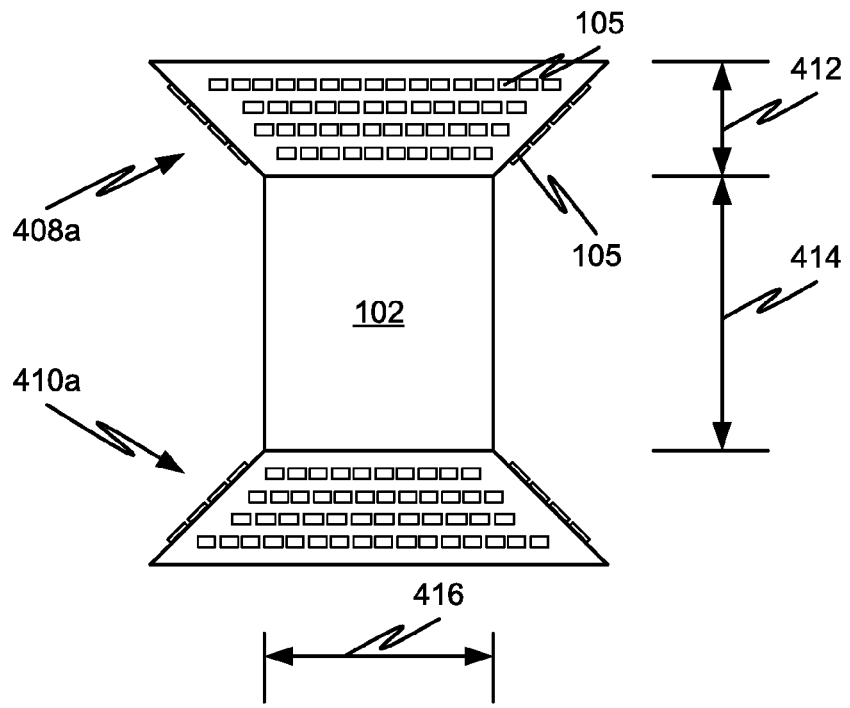

In another contemplated configuration, projections may be provided extending from the top and/or bottom of the boiler section, so as to form a skirt. Such an example is schematically illustrated in FIGS. 13A-13B. As shown in FIG. 13A, skirt 408 can be arranged adjacent to a top edge of receiver 102, while skirt 410 can be provided adjacent to a bottom edge of the receiver 102. Each panel 408a, 410a of the respective skirt 408, 410 can optionally include one or more photovoltaic converters 105 disposed on its surface in the direction of radiation reflected by a field of heliostats. The opposite side of panel 408a can also optionally include one or more photovoltaic converters to receive incident solar radiation directly from the sun. Thus, radiation reflected from heliostats can be received by one or more photovoltaic converters 105, while projections 408a and 410a can serve to alter the boundary layer adjacent to surfaces of boiler 102, thereby minimizing convective heat loss due to prevailing wind conditions.

Figure 13C:
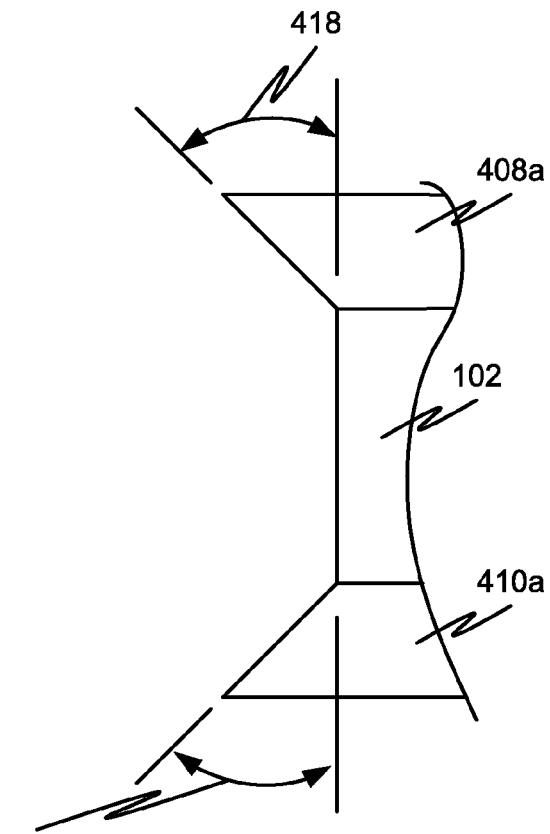
FIG. 13C is a cross-sectional view illustrating the orientation of the skirts and the receiver.

The receiver 102 can have a square cross-section, as illustrated in FIGS. 13A-13B. The receiver 102 can have a width 416, for example, of 4 m although other dimensions and cross-sectional shaped are also contemplated. The receiver can have a height 414 of 25 m. Each skirt 408, 410 can extend a height 412 of 5-10 m above the top or bottom of the receiver 102. Appropriate angles for the face of each skirt can be determined based on the effect of the skirt on convective heat loss and the range of angles of radiation directed by the heliostats onto the receiver. As shown in FIG. 13C, the face of the skirt 408a can be arranged at an angle 418 with respect to a vertical surface of the receiver 102 of, for example, 30°. The face of skirt 410a can be arranged at an angle 420 of, for example, 30°. The above dimensions and angles are for purposes of illustration only, and other dimensions and angles are of course possible according to one or more contemplated embodiments.

In some cases, a portion of the radiation reflected by the heliostats onto the surface of the boiler 102 may be reflected from the receiver surface and thus unused for heating the heat transfer or working fluid. To capture this previously unused portion, an L-shaped skirt may be provided on the top and/or bottom of the receiver. Such a configuration is illustrated in FIGS. 14A-14B.

Figure 14A:
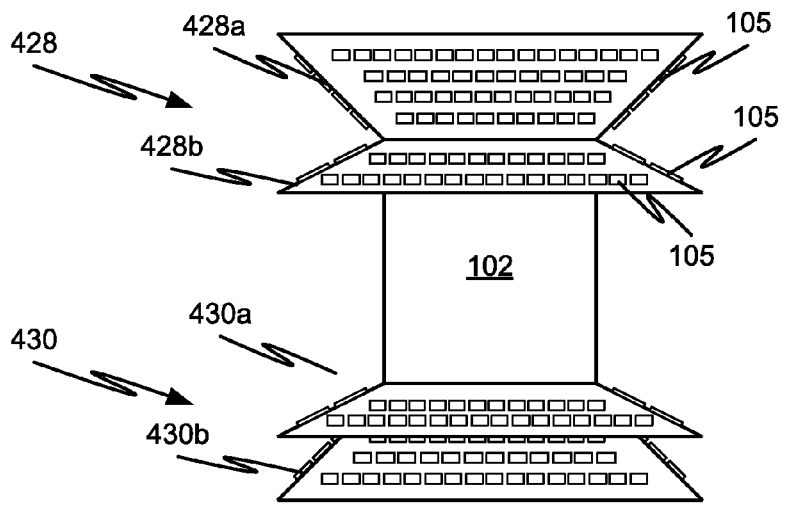
FIG. 14A is an elevation views of a receiver with a plurality of photovoltaic-element-containing skirts.
Figure 14B:
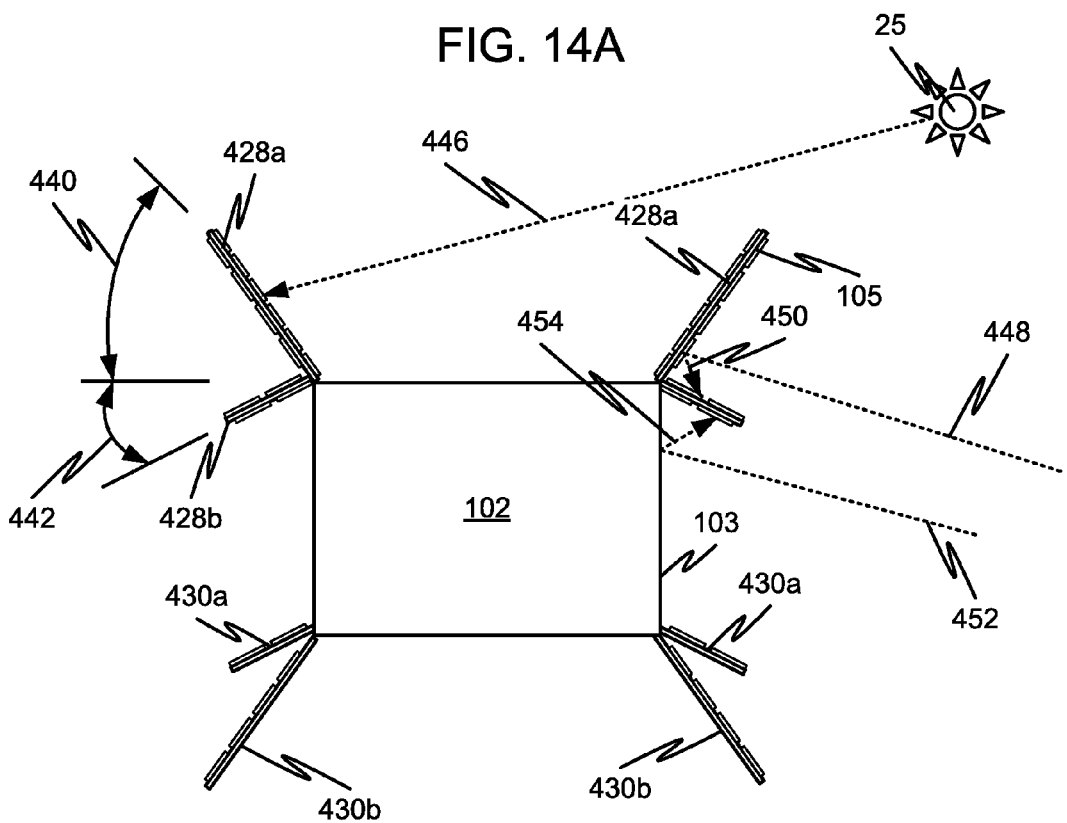
FIG. 14B is a cross-section view illustrating the orientation of the skirts and the receiver, and the interaction of reflected solar radiation with skirt and receiver surfaces.

As shown in FIGS. 14A-14B, top skirt 428 can include a plurality of angled projections 428a, which extend up and away from the top edge of boiler 102. The top skirt 428 also includes a plurality of angled projections 428b, which extend down and away from boiler 102. The bottom skirt 430 can include a plurality of angled projections 430b, which extend down and away from the bottom edge of boiler 102. The bottom skirt 430 can also include a plurality of angled projections 430a, which extend down and away from the bottom edge of boiler 102, but less than that of projection 430b.

Preferably the angle of declination of projections 430a and 430b is chosen such that the surface of the projection is parallel to the rays of reflected radiation from the farthest heliostat reflected on receiver 102, so as not to interfere with radiation incident on the receiver. For example, the angle of declination 442 can be 10°. Similarly, the angle of inclination of projection 428a and the angle of declination of projection 430b can be chosen based on the angles of reflected radiation by the heliostats to maximize energy production. For example, the angle of inclination 440 can be 80°. The length of projections 428a and 430b can be, for example, 4-6 m. The length of projections 430a and 428b can be, for example, 2-4 m. The above dimensions and angles are for purposes of illustration only, and other dimensions and angles are of course possible according to one or more contemplated embodiments.

The projections 428b can be provided with one or more photovoltaic converters 105 on the bottom surface thereof. Radiation 452 can be reflected by heliostats onto receiver 102. A portion of this radiation 452 may be reflected from the surface of the receiver 102 as radiation 454. Thus, one or more photovoltaic converters 105 on projections 428b can be arranged to capture the reflected radiation and convert it to electricity. Projections 428a can also be provided with one or more photovoltaic converters 105 on a surface thereof facing the field of heliostats. Radiation 448 can be reflected by heliostats directly at the projections 428a (or radiation 448 can be spillage from radiation directed at the receiver 102). The opposite sides of projections 428a and 428b can optionally be provided with one or more photovoltaic converters 105. For example, when the opposite side of projection 428b is provided with one or more photovoltaic converters 105, radiation 450 reflected from a surface of projection 428a can be captured and converted to electricity. In addition, when the opposite side of projection 428a is provided with one or more photovoltaic converters 105, radiation 446 directly from the sun may be captured and converted to electricity.

The projections 430a can be provided with one or more photovoltaic converters 105 on a top surface thereof. Similar to the operation of projections 428b, radiation reflected from a surface of the receiver 102 can be captured by one or more photovoltaic converters 105 arranged on the top surface of projections 428b. In addition, projections 430b can be provided with one or more photovoltaic converters 105 on a top surface thereof facing the field of heliostats. Thus, radiation can be reflected by the heliostats directly at projections 430*b* (or spillage from radiation directed at the receiver 102) and converted to electricity.

In another embodiment, a method for generating electricity includes aiming heliostat-mounted mirrors so as to reflect solar radiation substantially onto a boiler or boiler section in which a fluid is heated, and additionally includes converting a portion of the reflected radiation to electricity by photoelectric modules that include multi-junction or multi-bandgap photovoltaic cells or that alternatively include single-junction photovoltaic cells made of or based upon crystalline silicon. In an embodiment the photoelectric modules are above and/or below the boiler. In still another embodiment two boilers are provided, with one below and one above the photoelectric modules. In yet another embodiment, the reflected radiation incident on the photoelectric modules is radiation aimed substantially at the fluid-heating receiver or receiver section, and in an alternative embodiment the reflected radiation incident on the fluid-heating receiver or receiver section is radiation aimed substantially at the photoelectric modules.

In a further embodiment, a method for operating a solar power generation system includes aiming at least some heliostat-mounted mirrors substantially at a receiver or receiver section which includes tubes, pipes, or the like, in which a fluid is heated, or alternatively a cavity in which a gaseous phase fluid is heated, and aiming at least some heliostat-mounted mirrors substantially at a plurality of photoelectric modules which include multi-junction or multi-bandgap photovoltaic cells, or which alternatively include single-junction photovoltaic cells made of or based upon crystalline silicon.

In yet another embodiment, a method for generating electricity in a solar power generation system includes using part of the solar radiation incident on a plurality of heliostat-mounted mirrors for photovoltaic conversion of electricity in photoelectric modules that include multi-junction or multi-bandgap photovoltaic cells or that alternatively include single-junction photovoltaic cells made of or based upon crystalline silicon, and part for thermosolar power generation (i.e., heating a fluid for use in an electric power generating plant). In a preferred aspect the total electric power generated through the thermosolar and the photovoltaic conversion is greater than the rated thermosolar generation capacity of the system.

It is, thus, apparent that there is provided, in accordance with the present disclosure, solar power generation systems, methods and devices with multiple energy conversion modes. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

The invention claimed is:

1. A solar energy control method, comprising:
controlling a plurality of heliostats to track the apparent movement of the sun to concentrate sunlight on a receiver including first and second adjacent receiving surfaces, the first surface being configured to convert concentrated sunlight incident thereon into heat and a second surface having a photovoltaic converter;
controlling the plurality of heliostats to aim reflected light at the first receiving surface by arranging image spots thereon at edges adjacent an interface between the first and second surfaces such that sunlight that spills over the edge is substantially incident upon the second receiving surface;
controlling at least one of the plurality of heliostats such that its reflected light is moved from the first surface to the second surface responsively to a higher insolation level and controlling at least one of the plurality of heliostats such that its reflected light is moved from the second surface to the first surface responsively to a lower insolation level, such that a total incident sunlight on the first surface is limited below a total of which the plurality of heliostats is capable, and energy otherwise lost by spillage at edges of the first surface due to the aiming of heliostats at the edges is captured by the second surface and converted to electrical power by the photovoltaic converter.

2. The control method of claim 1, further comprising iteratively controlling flux distribution by aiming the plurality of heliostats multiple times in a day to different positions on the first surface such that limits on temperature gradient and maximum temperature are maintained below a potential capability of the plurality of heliostats.

3. A solar energy conversion system, comprising:
at least one heliostat;
a receiver with first and second surface portions,
the first surface portion including a heat exchanger configured to heat a fluid, the heat exchanger being connected to a thermal power plant configured to convert heat in the fluid to electric power,
the second surface portion including a photovoltaic surface configured to convert incident light to electricity; and
a controller configured to aim the at least one heliostat so as to reflect solar radiation onto both the first and second portions responsively to a determination of at least one of:
a uniformity of flux across the first portion; and
a total flux on the first portion exceeding a predetermined level.

4. The system of claim 3, wherein the determination includes a uniformity of flux across the first portion.

5. The system of claim 3, wherein the determination includes a total flux on the first portion exceeding a predetermined level.

6. The system of claim 3, wherein the first and second surface portions are mutually adjacent and supported on a same tower.

7. The system of claim 3, wherein at least a substantial part of the first surface portion is substantially vertical and at least a substantial part of the second surface portion forms an obtuse angle with respect to the at least a substantial part of the first surface portion.

8. A solar energy conversion system comprising:
a receiver in a first elevated tower;
a field of heliostats, each heliostat being configured to track the sun to reflect incident solar radiation at the receiver so as to heat a working fluid flowing through the receiver;
a conveyance device configured to transport heated working fluid from the receiver to an electric power generating plant, the heated working fluid being used by the electric power generating plant in the generation of electricity; and
a photovoltaic converting device arranged adjacent to the receiver so as to receive a portion of the solar radiation reflected toward edges of the receiver that misses the receiver.

9. The system of claim 8, wherein the photovoltaic converting device is arranged in the first elevated tower adjacent to the receiver so as to receive spillage of the reflected solar radiation from the receiver.

10. The system of claim 8, wherein a further photovoltaic converting device is arranged between adjacent sections of the receiver.

11. The system of claim 8, wherein the photovoltaic converting device is supported on a projection extending from the receiver, and at least a portion of the photovoltaic converting device overhangs the receiver so that solar radiation reflected by the heliostats at the receiver and subsequently reflected by a surface of the receiver is captured by the at least a portion.

12. A solar energy conversion system comprising:
a receiver in a first elevated tower;
a photovoltaic conversion device arranged in a second elevated tower;
a field of heliostats, at least some of the heliostats being configured to reflect solar radiation alternatively at the receiver and at the photovoltaic conversion device, the receiver being configured to use the reflected solar radiation incident thereon to heat a working fluid flowing through the receiver;
a conveyance device configured to transport heated working fluid from the receiver to an electric power generating plant, the heated working fluid being used by the electric power generating plant in the generation of electricity; and
a controller configured to control at least one of the heliostats to reflect solar radiation onto the receiver and at least another of the heliostats to reflect solar radiation onto the photovoltaic conversion device.

13. The system of claim 12, wherein the controller is configured to control the heliostats to change respective aiming points thereof between a surface of the receiver and a surface of the photovoltaic converting device.

14. A multi-mode solar energy conversion system comprising:
a plurality of focusing elements configured to track the sun and to focus incident solar radiation;
a receiver configured and arranged to receive focused solar radiation from the focusing elements so as to heat a fluid;
a thermal electric power plant configured to receive the heated fluid and generate electricity therefrom; and
an energy conversion device configured to generate electricity from at least a portion of the focused solar radiation not incident upon the receiver.

15. The system of claim 14, wherein the focusing elements are heliostats controlled to concentrate energy on the receiver.

16. The system of claim 14, wherein the energy conversion device includes a photovoltaic converter.

17. The system of claim 14, wherein the energy conversion device is arranged to receive spillage of radiation from the receiver.

18. The system of claim 14, wherein the energy conversion device is positioned and oriented to at least partially face the receiver such that it receives radiation reflected from a surface of the receiver.

19. The system of claim 18, wherein the energy conversion device is further positioned adjacent the receiver to receive focused energy from the focusing elements that misses the receiver.

20. The system of claim 14, further comprising:
a controller configured to refocus the focusing elements to direct energy from the receiver to the energy conversion device or from the energy conversion device to the receiver responsively to at least one of:
an available combined quantity of energy from all of the focusing elements exceeding a threshold level,
a determination of a reduction in energy incident on the receiver due to shading of at least one of the focusing elements,
a determination of energy loss due to shading of at least one of the focusing elements by at least another of the focusing elements, and
a predicted or identified loss of uniformity of flux over a surface of the receiver.

21. A multi-mode solar energy conversion method comprising:
heating a working fluid using a first portion of focused solar radiation;
generating electricity using the heated working fluid;
directly generating electricity from a second portion of the focused solar radiation; and
controlling heliostats to reflect incident solar radiation at respective aiming points on a surface of a receiver to generate the focused solar radiation,
wherein the controlling heliostats includes controlling the heliostats responsively to at least one of:
an available quantity of focused radiation from all of the heliostats exceeding a threshold level,
a determination of a reduction in energy incident on the receiver due to shading of at least one of the heliostats,
a determination of energy loss due to shading of at least one of the heliostats by at least another of the heliostats, and
a predicted or identified loss of uniformity of flux over a surface of the receiver.

22. The method of claim 21, wherein the directly generating electricity includes converting the second portion to electricity using a photovoltaic device.

23. A solar energy receiver for multi-mode solar energy conversion comprising:
a first receiver section configured to convey a working fluid therethrough and to receive focused solar radiation thereon,
the first receiver section having a top perimeter edge, a bottom perimeter edge, and at least one corner edge extending between the top and bottom perimeter edges; and
at least one projection projecting from the first receiver section at the top perimeter edge, the bottom perimeter edge, or the at least one corner edge,
the at least one projection being configured and disposed to modify airflow around the first receiver section so as to reduce convection heat loss from the first receiver section.

24. The receiver of claim 23, wherein the at least one projection modifies boundary layer thickness adjacent to at least one of the exterior surfaces.

25. The receiver of claim 23, the at least one projection being a plurality of projections, each being a planar extension at a respective corner edge of the first receiver section.

26. The receiver of claim 23, the at least one projection being a plurality of projections, each being an angled planar extension at the top perimeter edge of the first receiver section so as to form a skirt with a progressively increasing perimeter.

27. The receiver of claim 23, the at least one projection being a pair of angled planar extensions forming an L-shaped cross-section and arranged at the top perimeter edge of the first receiver section.

28. The receiver of claim 23, the projection including a photovoltaic cell.

29. The receiver of claim 23, the at least one projection including at least one photovoltaic cell, the projection being arranged such that the at least one photovoltaic cell captures radiation reflected from the first receiver section or another projection.

30. A method of converting solar energy to electricity, comprising:
concentrating sunlight;
directing the concentrated sunlight at a thermal receiver configured to transfer all the concentrated sunlight received thereby as thermal energy to a heat transfer fluid; and
maintaining a temperature uniformity of the thermal receiver at least in part by periodically redirecting at least a portion of the concentrated sunlight to a photoelectric receiver that converts said portion of the concentrated sunlight directly to electricity.

31. The method of claim 30, wherein
the directing includes directing concentrated sunlight at edges of the thermal receiver such that a first portion of the concentrated sunlight spills over the edges of the thermal receiver, and
the maintaining a temperature uniformity includes capturing the first portion of the concentrated sunlight with the photoelectric receiver, which converts the first portion directly to electricity.

32. The method of claim 30, wherein the thermal and photoelectric receivers are mutually adjacent.

33. A method of converting solar energy to electricity, comprising:
directing concentrated sunlight at a thermal receiver configured to transfer all the concentrated sunlight received thereby as thermal energy to a heat transfer fluid;
maintaining a temperature uniformity of the thermal receiver at least in part by directing concentrated sunlight at edges of the thermal receiver such that a portion thereof spills over the edges; and
capturing the spilled portion of concentrated sunlight with a photoelectric receiver configured to convert energy received thereby directly to electricity.

34. The method of claim 33, further comprising maintaining a temperature uniformity of the thermal receiver at least in part by periodically redirecting at least a first portion of the concentrated sunlight to the photoelectric receiver, which converts the first portion directly to electricity.

35. The method of claim 33, wherein the thermal and photoelectric receivers are mutually adjacent.

36. The system of claim 8, wherein the photovoltaic converting device is arranged in said first elevated tower at a different elevation from the receiver.

37. The system of claim 14, wherein the focusing elements are disposed in a region surrounding the receiver in plan view.

38. The method of claim 21, wherein the controlling heliostats includes changing at least one of the respective aiming points of the heliostats.

* * * * *